United States Patent
Ploem

(10) Patent No.: US 11,297,896 B2
(45) Date of Patent: Apr. 12, 2022

(54) DIRECT BOTTOMED ARTICLE OF FOOTWEAR WITH A FILM

(71) Applicant: NIKE, Inc., Beaverton, OR (US)

(72) Inventor: Steven Edmund Jan Cornelis Ploem, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 17/097,947

(22) Filed: Nov. 13, 2020

(65) Prior Publication Data

US 2021/0059352 A1 Mar. 4, 2021

Related U.S. Application Data

(62) Division of application No. 16/270,388, filed on Feb. 7, 2019, now Pat. No. 10,869,524.

(Continued)

(51) Int. Cl.
*A43B 13/18* (2006.01)
*A43B 13/02* (2006.01)
(Continued)

(52) U.S. Cl.
CPC ............. *A43B 13/18* (2013.01); *A43B 9/18* (2013.01); *A43B 13/02* (2013.01); *A43B 13/12* (2013.01);
(Continued)

(58) Field of Classification Search
CPC ........... A43B 13/18; A43B 9/18; A43B 13/02; A43B 13/12; A43B 13/122; A43B 13/125;
(Continued)

(56) References Cited

U.S. PATENT DOCUMENTS

| 5,193,240 A | 3/1993 | Salpietro |
| 6,457,263 B1 | 10/2002 | Rudy |

(Continued)

FOREIGN PATENT DOCUMENTS

| CN | 1419424 A | 5/2003 |
| CN | 1524470 A | 9/2004 |

(Continued)

OTHER PUBLICATIONS

Final Office Action received for U.S. Appl. No. 16/424,072, dated Aug. 9, 2021, 16 pages.

(Continued)

*Primary Examiner* — Stella K Yi
(74) *Attorney, Agent, or Firm* — Shook, Hardy & Bacon LLP

(57) ABSTRACT

An article of footwear has an upper that is direct attached with the sole. The sole has a film extending up sidewalls of the sole to a film edge that is prior to the sidewall and the upper joining. Method of manufacture of the article of footwear includes steps of positioning a film over a mold cavity and then securing the film to the mold. The film is heated and then drawn into the mold cavity under a vacuum. The film forms a liner of the mold cavity. A foam composition is injected into the lined mold cavity. As the foam composition expands, the foam composition interacts with and mechanically engages with the upper that is positioned at the mold cavity to allow for the mechanical engagement that results in the direct attach of the sole to the upper. The film is then trimmed from the sole sidewalls.

12 Claims, 14 Drawing Sheets

Related U.S. Application Data

(60) Provisional application No. 62/628,134, filed on Feb. 8, 2018.

(51) Int. Cl.

| | | |
|---|---|---|
| *A43B 13/28* | (2006.01) | |
| *A43B 13/12* | (2006.01) | |
| *B29D 35/00* | (2010.01) | |
| *A43B 9/18* | (2006.01) | |
| *B29D 35/10* | (2010.01) | |
| *A43B 23/04* | (2006.01) | |
| *A43B 13/40* | (2006.01) | |
| *A43D 3/02* | (2006.01) | |

(52) U.S. Cl.
CPC .......... *A43B 13/122* (2013.01); *A43B 13/125* (2013.01); *A43B 13/28* (2013.01); *A43B 23/042* (2013.01); *B29D 35/0009* (2013.01); *B29D 35/10* (2013.01); *A43B 13/40* (2013.01); *A43D 3/022* (2013.01)

(58) Field of Classification Search
CPC .. A43B 13/28; A43B 23/042; B29D 35/0009; B29D 35/10
See application file for complete search history.

(56) References Cited

U.S. PATENT DOCUMENTS

| | | | |
|---|---|---|---|
| 8,127,468 | B2 | 3/2012 | Morgan |
| 9,282,785 | B2 | 3/2016 | Grondin |
| 2002/0170650 | A1 | 11/2002 | Chi |
| 2006/0265908 | A1 | 11/2006 | Palmer et al. |
| 2016/0081426 | A1 | 3/2016 | Olivieri |
| 2017/0000213 | A1 | 1/2017 | Mason et al. |
| 2017/0251751 | A1 | 9/2017 | Baghdadi et al. |
| 2017/0265565 | A1 | 9/2017 | Connell et al. |
| 2019/0239596 | A1 | 8/2019 | Ploem |
| 2019/0365027 | A1 | 12/2019 | Chamblin |

FOREIGN PATENT DOCUMENTS

| | | |
|---|---|---|
| CN | 104125785 A | 10/2014 |
| CN | 105639837 A | 6/2016 |
| CN | 105666908 A | 6/2016 |
| CN | 106108259 A | 11/2016 |
| CN | 106942828 A | 7/2017 |
| DE | 4200730 A1 | 7/1993 |
| EP | 1398140 A1 | 3/2004 |
| FR | 2583269 A1 | 12/1986 |
| JP | 1-280401 A | 11/1989 |
| JP | 5-84769 A | 4/1993 |
| JP | 4880480 B2 | 12/2011 |
| TW | 585750 | 5/2004 |
| TW | M499789 U | 5/2015 |
| TW | M512936 U | 12/2015 |
| WO | 01/01805 A1 | 1/2001 |

OTHER PUBLICATIONS

Non-Final Office Action received for U.S. Appl. No. 16/424,072, dated Jan. 4, 2021, 12 pages.

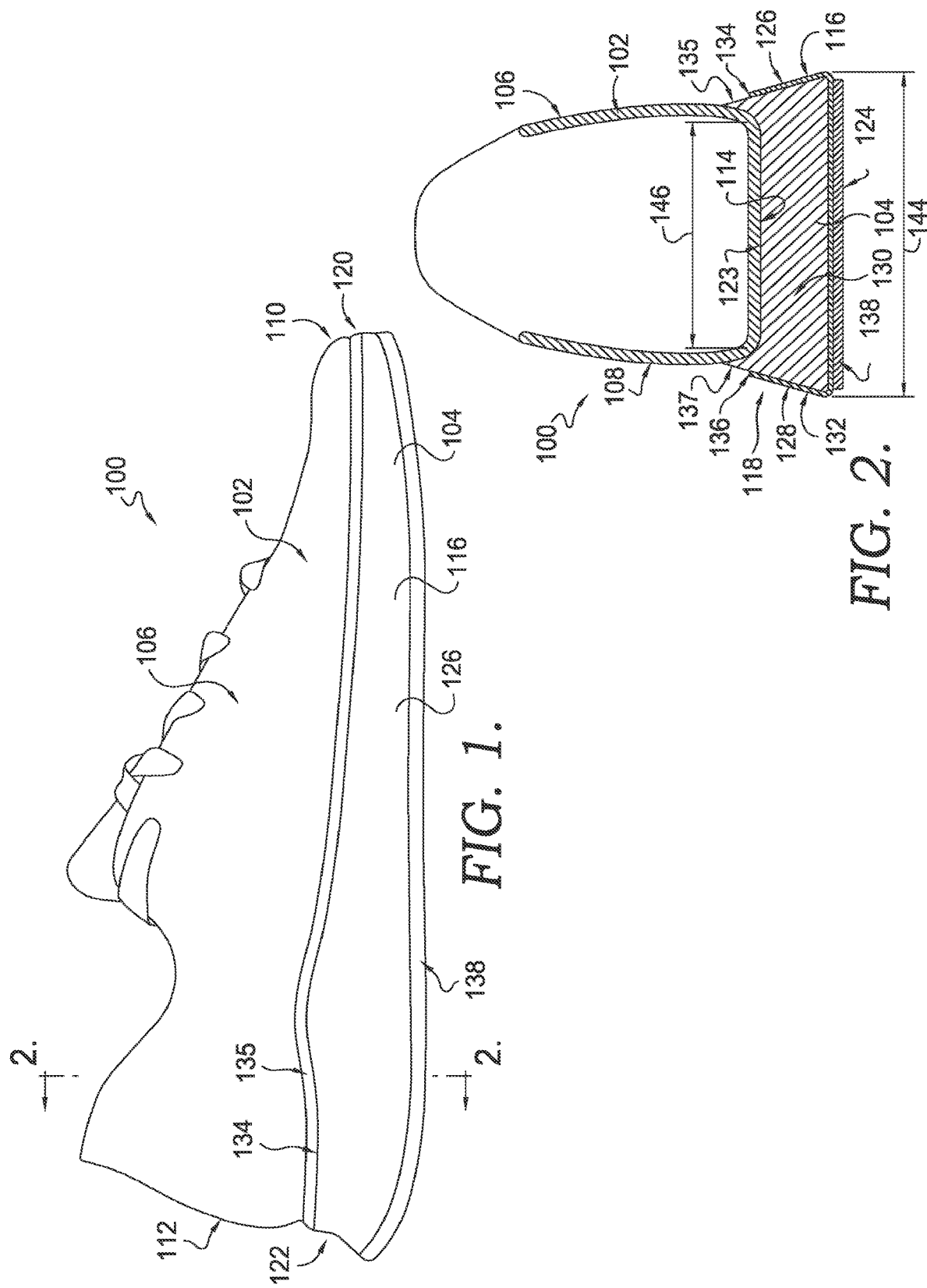

DIRECT BOTTOMED ARTICLE OF FOOTWEAR WITH A FILM

CROSS-REFERENCE TO RELATED APPLICATIONS

This is a divisional application of U.S. application Ser. No. 16/270,388, titled "Direct Bottomed Article of Footwear with a Film," and filed Feb. 7, 2019, which claims the benefit of priority of U.S. Application No. 62/628,134, titled "Direct Bottomed Article of Footwear with a Film," and filed Feb. 8, 2018. The entirety of each of the aforementioned applications is incorporated by reference herein.

TECHNICAL FIELD

Directed to an article of footwear with a direct attached sole.

BACKGROUND

Traditionally, an article of footwear is formed with an upper and a sole that are joined subsequent to the formation of each. This process includes the positioning and aligning of the separate components to then be bonded with various techniques, such as an adhesive.

BRIEF SUMMARY

Aspects hereof contemplate an article of footwear having an upper that is directly attached with the sole. The sole has a film extending up sidewalls of the sole to a film edge that is prior to the sidewall and the upper joining. Method of manufacture of the article of footwear includes steps of positioning a film over a mold cavity and then securing the film to the mold. The film is heated and then drawn into the mold cavity under a vacuum. The film forms a liner of the mold cavity. A foam composition is injected into the lined mold cavity. As the foam composition expands, the foam composition interacts with and mechanically engages with the upper that is positioned at the mold cavity to allow for the mechanical engagement that results in the direct attach of the sole to the upper. The film is then trimmed from the sole sidewalls at the film edge.

This summary is provided to enlighten and not limit the scope of methods and systems provided hereafter in complete detail.

DESCRIPTION OF THE DRAWINGS

The present invention is described in detail herein with reference to the attached drawing figures, wherein:

FIG. 1 depicts an article of footwear, in accordance with aspects hereof;

FIG. 2 depicts a cross section of the article of footwear from FIG. 1, in accordance with aspects hereof;

DETAILED DESCRIPTION

Figure 3:
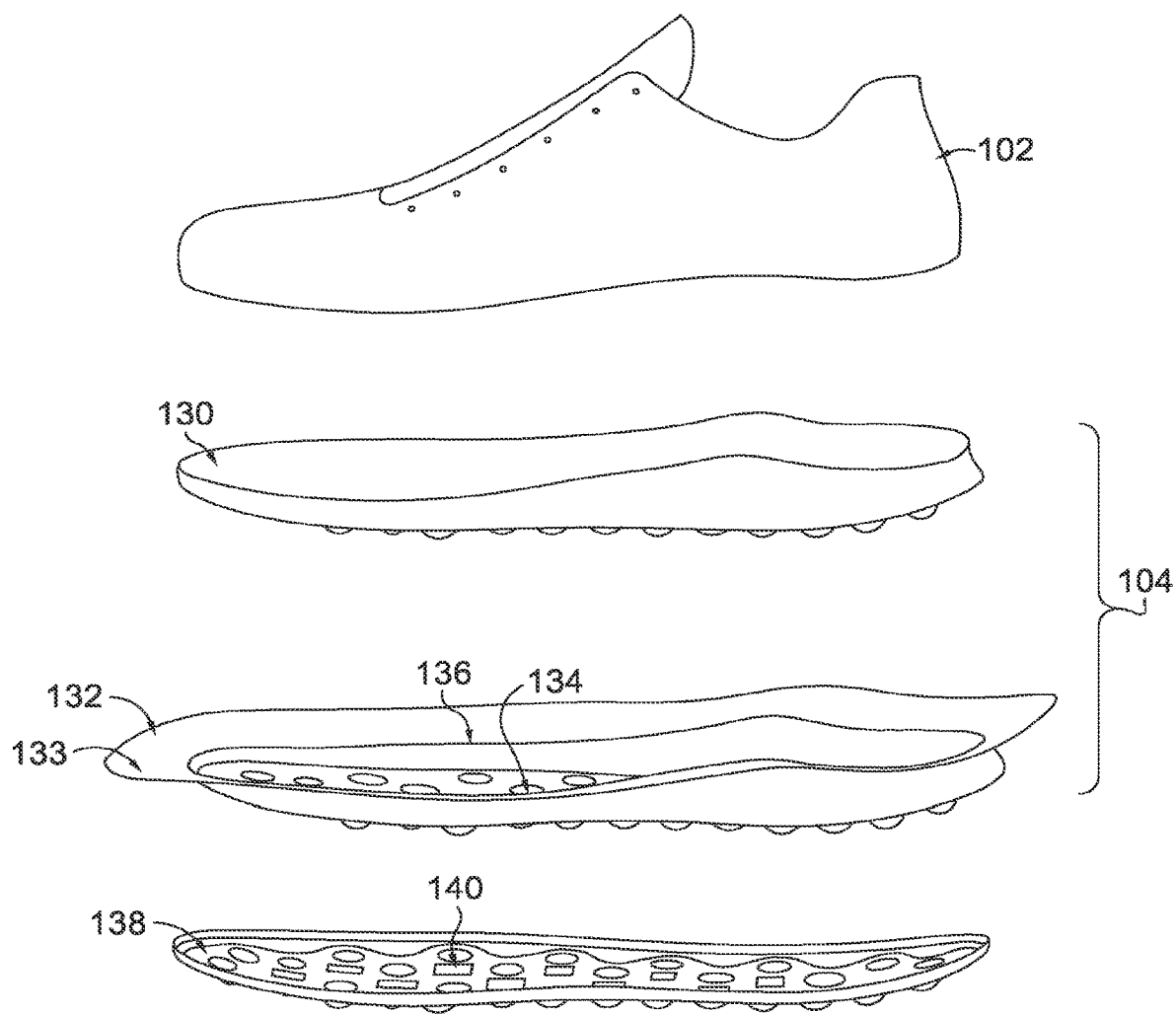
FIG. 3 depicts an exploded view of the article of footwear from FIG. 1, in accordance with aspects hereof.

Traditional methods of manufacturing an article of footwear include a variety of processes that are performed in sequence to result in the formation of the footwear (e.g., shoe, cleat, sandal, slipper, and boot). In an effort to reduce manufacturing time, manufacturing cost, and potential defects, an elimination or consolidation of steps being performed is sought. Traditional shoe manufacturing, such as an athletic shoe, includes the formation of a footwear upper ("upper"), the portion of the shoe that secures the shoe to a wearer's foot. The upper is then joined with a footwear bottom unit, which is commonly referred to as a sole. The sole may be comprised of a variety of materials and/or components, such as an outsole, a midsole, and/or an insole.

However, any combination of materials/components may be formed and produced in connection with the manufacture of a shoe.

Traditional manufacturing techniques for a shoe include the joining of a formed upper with a formed sole. This joining may be accomplished through use of an adhesive applied to one or more surfaces to be joined of the upper and the sole and then positioning the upper and the sole in contact for the adhesive to couple the components into an article of footwear. This step of joining the upper and the sole introduces a manufacturing process that adds time, cost, and the potential for defects. For example, if the adhesive extends beyond an area to be joined (e.g., beyond a biteline of the upper), the adhesive may be visible and cause a degradation of the aesthetic characteristics of the shoe. Further, the sole and the upper may not be properly aligned during the joining causing a defective shoe. Additionally, the joining process introduces adhesives or other bonding materials into the footwear that can affect performance and feel of the finished article. Further yet, the adhesive or bonding material adds material cost and additional manufacturing inventory to the planning and production for the shoe.

As a result, a concept of direct bottoming (or sometimes referred to as direct attach) is provided. Direct bottoming, for purposes of the present disclosure, includes the formation of at least a portion (e.g., a foamed midsole) of the sole with the upper present and results in the sole being joined with the upper. For example, it is contemplated that a molding operation is performed where a polymeric foam composition (e.g., polyurethane "PU") is injected into a mold cavity wherein a plantar portion (e.g., under foot portion) of the upper is positioned at the mold cavity. As the polymeric foam composition expands during a foaming process, the polymeric composition interacts with the plantar region of the upper to form at least a mechanical engagement between the polymeric foam composition and the upper material. As the polymeric foam composition cures, the physical engagement between the polymeric foam composition and the upper forms a bond coupling the two together with sufficient bond strength for use as an article of footwear. A direct bottoming process allows for the reduction of materials and or steps during the method of manufacturing. For example, the direct bonding between the polymeric foam composition as it cures and the upper can eliminate the use of an adhesive, in some aspects. Further, as the sole is molded in the presence of the upper, alignment, size, and fit of the sole and upper are better ensured.

Direct bottoming of an article of footwear does, however, adjust processing steps for the forming of the footwear relative to a traditional manufacturing process. For example, as the sole is not formed until it is joined with the upper, refinements and processing of the sole is done in the presence of the upper. Tooling, such as a mold, used when forming the direct attached sole may create tooling marks in the sole. A tooling mark is an unintended feature that results from the manufacturing of the sole. Tooling marks may result from intersections of tooling portions (e.g., a medial ring intersecting with a lateral ring to result in a line or other feature at the junction of the tooling portions). The tooling marks may be addressed through buffing, cutting, polishing, and other operations to reduce or eliminate the presence of the tooling marks. However, in direct bottoming manufacturing, the upper is present during the rectification steps to the sole, which may expose the upper to opportunities for damage or other defects.

Aspects hereof contemplate forming an article of footwear through a direct bottoming process that limits unintended tooling-induced features, allows for customization in a sequential manufacturing process, reduces materials, and eliminates manufacturing processes.

Specifically, turning to FIG. 1, which depicts an article footwear 100, in accordance with aspects hereof. The article of footwear 100 is formed with an upper 102 comprising a medial side 106, a lateral side 108, a toe end 110, a heel end 112, and a plantar region 114 extending between the medial side 106, the lateral side 108, the toe end 110, and the heel end 112. The article of footwear also includes a sole 104 having a medial side 116, a lateral side 118, a toe end 120, a heel end 122, an upper-facing surface 123 extending between the medial side 116, the lateral side 118, the toe end 120, and the heel end 122, a ground-facing surface 124 opposite the upper-facing surface 123, a medial sidewall 126 extending between the ground-facing surface 124 and the upper-facing surface 123 along the medial side 116, and a lateral sidewall 128 extending between the ground-facing surface 124 and the upper-facing surface 123 along the lateral side 118. The sole 104 includes a polymeric foam composition 130 forming at least a portion of the upper-facing surface 123 and mechanically engaged with the upper plantar region 114. The sole also comprised of a polymeric film composition 132 forming at least a portion of the medial sidewall 126 from the ground-facing surface 124 toward the upper 102 at a medial film edge 134 and also forming at least a portion of the lateral sidewall 128 from the ground-facing surface 124 toward the upper 102 at a lateral film edge 136. There is at least 1 mm between the upper-facing surface 123 at the medial sidewall 126 and the medial film edge 134 forming a medial exposed portion 135 and there is at least 1 mm between the upper-facing surface 123 at the lateral sidewall 128 and the lateral film edge 136 forming a lateral exposed portion 137. The article of footwear 100 is also comprised of an outsole 138, in the depicted example.

As will be provided in greater detail herein, the sole 104 is formed from the polymeric foam composition 130 that is direct attached to the upper 102 during the sole 104 forming process. The sole 104 also includes the polymeric film composition 132 that forms an exterior surface of the sole along portions of the sidewall(s). This polymeric film composition 132 is effective to provide a variety of different visual characteristics to the article of footwear 100, such as variations in coloration, texture, and graphics, and other finishes. Further, it is contemplated that the polymeric film composition 132 provides a protective barrier to the polymeric foam composition 130 from the environment. For example, the polymeric film composition 132 may protect against hydrolysis and ultraviolet radiation effects on the polymeric foam composition 130. Further yet, the polymeric film composition 132 reduces unintended tool marking features from being formed by the manufacturing tools as the polymeric film composition serves as a liner between the tooling (e.g., a mold 200 of FIG. 3) and the polymeric foam composition 130. The liner formed by the polymeric film composition 132 is effective to transition between tooling portions that would otherwise create a tooling mark feature that would subsequently be processed away.

Figure 19:
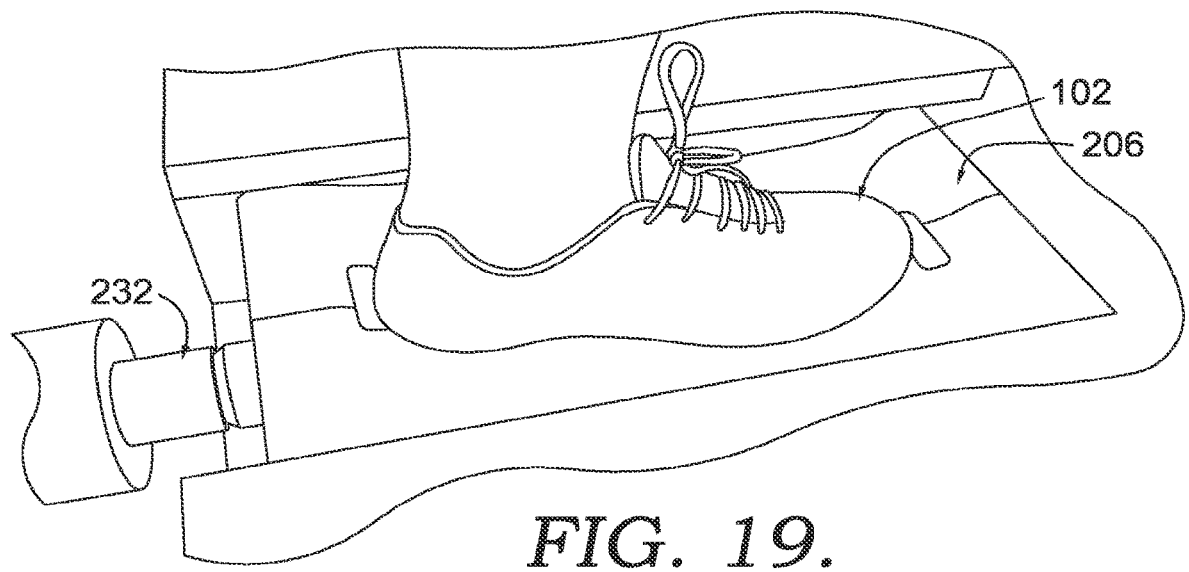
FIG. 19 depicts the mold and upper of FIG. 18 in a closed configuration with polymeric foam composition being injected for a direct bottoming process, in accordance with aspects hereof.

Exposed regions, such as the medial exposed portion 135 and the lateral exposed portion 137, provide several advantages to the aspects contemplated herein. For example, the exposed regions are a region at which the polymeric film composition 132 is not present on an exterior surface of the article of footwear 100. Terminating the polymeric film composition 132 at the film edges, such as the medial film edge 134 and the lateral film edge 136, allows for an efficient and effective termination of the polymeric film composition 132. For example, the exposed region provides area in which a trimming operation may be performed on the polymeric film composition 132 (as best seen in FIG. 19 hereinafter). Without the exposed region of at least 1 mm between the film edge and the upper, a cutting tool may not properly access and cleanly cut excess polymeric film composition from the polymeric foam composition. Further, the exposed region provides more opportunities for design flexibility in the article of footwear. Having the exposed region between the polymeric film composition 132 and the upper 102 allows for a difference in visual characteristics, such as material, texture, color, reflectance, graphics, and the like. The footwear may therefore be designed to have a variety of appearances as a result of the inclusion of the exposed region. An exposed region may extend around the entire article of footwear or it may extend only along some portions, such as the medial side and the lateral side. The exposed portion may have a constant band thickness or the exposed portion may have a variable band thickness.

The polymeric foam composition 130 may be any polymeric composition. Foam is a cellular structure with either open celled or closed cell structures of polymeric composition and voids, such as gas voids. In an exemplary aspect, the polymeric foam composition is a polyurethane ("PU") composition. The PU may be chemically foamed or mechanically foamed during the curing process to result in a polymeric foamed composition. The polymeric foam composition may include additional components, such as colorants and other additives. While PU composition is specifically listed, other polymeric compositions are contemplated, such as ethylene-vinyl acetate, low-density polyethylene, nitrile rubber, polychloroprene, polyimide, polypropylene, polystyrene, polyvinyl chloride, silicone, and the like. However, as will be discussed in greater detail, bonding affinity between the polymeric foam composition 130 and the polymeric film composition 132 during the curing phase of the polymeric foam composition 130 drives manufacturing efficiencies. An exemplary combination of materials that have sufficient bonding affinity are PU as the polymeric foam composition 130 and thermoplastic polyurethane ("TPU") as the polymeric film composition 132.

The polymeric film composition 132 may be any polymeric composition. Film is a thin layer of polymeric composition having a thickness in a range of about 50 microns to about 600 microns. In an exemplary aspect, the polymeric film composition prior to being inserted into a mold cavity (or subsequent), as will be discussed hereinafter, has a thickness in a range of about 100 microns to about 400 microns. Within this exemplary range, the polymeric film composition 132 provides sufficient durability to serve as an exterior surface on an article of footwear, has sufficient resilience to be formed as a liner of a mold cavity during manufacturing, and is sufficiently thick to obscure tooling irregularities that would otherwise generate unintended tool markings in the polymeric foam composition 130, for example. Other thickness ranges are contemplated and vary with a polymeric composition selected. In an exemplary aspect the polymeric film composition 132 is a TPU composition. Further, in an exemplary aspect, the polymeric film composition 132 is a TPU composition having a thickness of 100 to 300 microns. Further yet, in an exemplary aspect the polymeric film composition 132 is a non-porous film capable of being formed as a liner in a mold cavity under vacuum.

The polymeric film composition 132 may have a variety of visual characteristics. Visual characteristics include, but are not limited to, material, sheen, coloration, reflectance, texture, graphical presentation, and the like. As will be appreciated throughout, the polymeric film composition 132 may be changed from one shoe to the next shoe during a continuous manufacturing process. As a result during a continuous production run, shoes having different visual characteristics may result from a common manufacturing process without significant alteration of the manufacturing mechanisms. Instead, it is contemplated that a different polymeric film composition may be provided during the manufacturing process. This convenience and flexibility allows for continued use of the capital equipment while still offering customized manufacturing options. For example, a first shoe may be produced with a first polymeric film composition having a first visual characteristic and the subsequent shoe to be produced without stopping production may use a second polymeric film composition having a different visual characteristic.

The upper 102 may be formed from any material, such as animal-based fibers (e.g., wool, hair, silk), plant-based fiber, and/or synthetic fibers. In an exemplary aspect, the upper 102 is formed from a textile material having one or more fibers in the plantar region 114. The fibers in the plantar region 114 provide a surface to which the polymeric foam composition 130 may interact and mechanically bond therewith. For example, the upper 102 may be formed from a knit, woven, braided, non-woven, and the like textile comprising one or more yarns, filaments, and/or fibers that provide a surface amenable for direct bottoming. In some aspect, the upper 102 in at least the plantar region 114 includes a porous structure that allows a yet-to-be cured (e.g., fluid-like properties that allow the polymeric composition to flow around and/or through the porous structure) polymeric composition to infiltrate and/or at least partially encapsulate some of the fibrous elements forming the textile. Once encapsulated, the polymeric composition cures to a solid or more resilient state (e.g., cures as a foamed polymeric composition) forming a mechanical bond with the upper 102 through the interaction with the encapsulated fibrous elements. Further, it is contemplated that a chemical bond may additionally or alternatively be formed by the polymeric composition and the upper as the polymeric composition cures to a foamed polymeric composition state. The chemical bond is contemplated when compositions having an affinity for chemical bonding, such as an upper having PU and/or TPU compositions forming at least a portion of the plantar region 114 (e.g., a knit upper having TPU and/or PU yarns integrally knit in at least the plantar region 114) and the polymeric foam composition 130 comprises a PU composition. In this example, the upper and the polymeric foam composition form a direct bottom bond through mechanical engagement and/or chemical engagement of the various compositions.

Similarly, it is contemplated that a chemical bond may be formed between the polymeric foam composition 130 and the polymeric film composition 132 to join the two compositions. As such, it is contemplated that the polymeric foam composition 130 and the polymeric film composition 132 are selected to have a sufficient chemical bonding affinity to resist delamination. An exemplary combination of material compositions with sufficient delamination resistance includes the polymeric foam composition 130 as a PU composition and the polymeric film composition 132 as a TPU composition. Other compositions are contemplated.

Returning to FIG. 1, the article of footwear 100 is depicted as an athletic shoe; however, it is contemplated that any type of article of footwear may result from aspects provided herein. Of focus in the following discussions are the sole 104 and the compositions of the sole 104 at different locations. Specifically, the polymeric film composition 132 is depicted as extending in a superior direction from the ground-facing surface 124 toward the upper 102. In actuality for the specific configuration provided in FIGS. 1-3, the polymeric film composition 132 is a continuous film material extending across the ground-facing surface 124 and forming the exterior of that surface while continuing, uninterrupted, up the medial sidewall 126 and the lateral sidewall 128. Therefore, in this example, the polymeric film composition 132 forms the exterior surface of the sole 104 from the film edge (e.g., the medial film edge 134 and the lateral film edge 136) inferiorly. The outsole 138 may optionally be secured to the sole 104 in some aspects to then form an exterior surface of the article of footwear 100 at a ground-contacting region. As used herein, anatomical relational terms, such as superior, inferior, proximal, distal, medial, lateral, and the like are in relation to an article of footwear in a traditional as-worn configuration on a user in and standing position. Therefore an inferior direction extends towards a traditional ground-contacting surface and a superior direction extends in a direction more proximal to the wearer in the as-worn configuration.

The exposed regions of the sole 104, such as the medial exposed portion 135 and the lateral exposed portion 137, are at least a 1 mm band extending between the upper 102 intersection with the sole 104 and the film edge. As provided previously, the exposed region provides various advantages to the examples provided herein. For example, ease of trimming the polymeric film composition 132 with reduced interference of the upper 102, design flexibility with variations in visual characteristics of between the upper 102, the exposed region, and the polymeric film composition 132. The exposed region may have a length extending between the upper 102 and the film edge of any length. However, in an exemplary aspect the exposed region has a length of at least 1 mm. In an additional exemplary aspect the length is at least 1 mm and less than 10 mm. In yet another exemplary aspect, the exposed region length is between about 2 mm and about 4 mm. The provided range of exposed area length extending between the upper and the film edge provides sufficient area to allow for trimming operations while still providing sufficient coverage and protection of the polymeric foam composition 130 by the polymeric film composition 132.

FIG. 2 depicts a cross section of the article of footwear 100, in accordance with aspects hereof. The upper 102, the sole 104, and the outsole 138 are illustrated. The sole 104 is formed from the polymeric foam composition 130 and the polymeric film composition 132. The sole 104 has angled sidewalls, as seen in FIG. 2. Specifically, a first distance 144 at the ground-facing surface 124 is greater than a second distance 146 at the upper-facing surface 123 in this medial to lateral cross section view. The first distance 144 and the second distance 146 are measured from the medial side 116 to the lateral side 118. An angled sidewall with direct bottomed footwear is possible, in an exemplary aspect, as a result of the polymeric film composition 132 serving as a liner to the mold cavity for easier release of the sole 104 therefrom relative to a non-liner configuration.

As also depicted in FIG. 2, the polymeric film composition 132 extends underfoot forming the ground-facing surface 124 of the sole 104. As will be appreciated in FIGS. 7-16, the polymeric film composition 132 extends underfoot to form a liner for a mold cavity prior to the mold cavity receiving the polymeric composition that will foam as the polymeric foam composition 130. In aspects provided, the polymeric film composition 132 is formed into a liner through use of vacuum pressure drawn through the mold cavity and, in a specific example, through a bottom plate of the mold cavity that forms the ground-facing surface. To effectively draw the polymeric film composition 132 with a vacuum has the polymeric film composition 132 as a continuous film that extends over the mold cavity and is drawn down into the mold cavity while maintaining continuity to ensure a pressure differential (e.g., lower pressure created by the vacuum between the mold cavity and the film and a relatively higher pressure on the opposite surface of the film at atmospheric pressure) that forms the films to the mold cavity surfaces. Therefore, the polymeric film composition 132 extends across the ground-facing surface 124 from the sidewalls.

The polymeric foam composition 130 extends as a continuous foam composition from the polymeric film composition 132 on the ground-facing surface 124 and the sidewalls to the upper-facing surface 123 at a location of mechanical engagement with the upper 102. While not depicted, it is contemplated that one or more inserts may be encapsulated in the sole 104. For example, as will be depicted in FIG. 20, it is contemplated that an insert (e.g., air bag, stability element, support element, foam element) may be positioned in the mold cavity having the polymeric film composition 132 as a liner and prior to the polymeric foam composition 130 being inserted. The insert may be positioned within the mold cavity prior to the positioning of the upper 102 at the mold. Alternatively, it is contemplated that the insert may be positioned on the upper 102, such as the plantar region 114, to position the insert into the mold cavity when the upper 102 is positioned at the mold, as will be described hereinafter. Regardless of the initial positioning of the insert, this encapsulated insert is maintained in a relative position of the sole 104 by the compositions forming the sole 104 and provides varied functional characteristics (e.g., impact attenuation, resilience, support) at a specified location of the sole 104.

The article of footwear 100 as depicted in FIG. 2 shows the upper 102 lateral side 108, the medial side 106, and the plantar region 114. At the plantar region 114 the polymeric foam composition 130 is mechanically engaged with the upper 102. While not depicted, in some aspects it is contemplated that the cross sectional view will depicts at least a portion of the polymeric foam composition 130 extending into the material forming the plantar region 114 forming a mechanical bond. The sole 104 is depicted with the lateral exposed portion 137 and the medial exposed portion 135. The exposed portions extend between the upper 102 and the respective lateral film edge 136 and the medial film edge 134. Continuing in an inferior direction from the film edge, the polymeric film composition 132 extends down along the sidewalls, such as the medial sidewall 126 and the lateral sidewall 128, to form the ground-facing surface 124. As depicted in FIG. 2, the polymeric film composition 132 is a continuous and relatively non-porous material that is able to be drawn as a liner into a mold cavity through vacuum pressure. The outsole 138 is depicted as being joined with the polymeric film composition 132 at the ground-facing surface 124. A first distance 144 extending between the medial side and the lateral side at the ground-facing surface 124 is provided. A second distance 146 extending between the medial side and the lateral side at the upper-facing surface 123 is provided. The first distance 144 is greater than the second distance 146 as the medial sidewall 126 and the lateral sidewall 128 angle towards one another in the superior direction (i.e., away from the ground-facing surface 124 towards the upper-facing surface 123).

FIG. 3 depicts an exploded view of the article of footwear 100 prior to trimming the polymeric film composition, in accordance with aspects hereof. The upper 102, the polymeric foam composition 130, the polymeric film composition 132, and the outsole 138 are illustrated. The sole 104 is comprised of the polymeric foam composition 130 and the polymeric film composition 132, in this exemplary aspect. While the outsole 138 is depicted, it is optional in some exemplary aspects. It is contemplated that the polymeric film composition 132 may serve as a ground contacting surface in some examples. Further, it is contemplated that the polymeric film composition 132 may have traction elements (e.g., lugs, treads) integral to the film or formed into the film during the molding operation with the polymeric foam composition 130, in yet another exemplary aspect.

The polymeric film composition 132 is depicted having the trimmed portion 133 extending from what will be the film edges, such as the medial film edge 134 and the lateral film edge 136 following a trimming operation. The outsole is depicted having a plurality of the outsole apertures 140. As previously discussed, the outsole aperture 140 provides a conduit through which vacuum may transfer from the bottom plate to the mold cavity to effectively draw the polymeric film composition 132 into the mold cavity. In an exemplary aspect, the outsole 138 is comprised of a plurality of the apertures extending through the outsole 138 to allow for an even and complete draw of the polymeric film composition 132 into the mold cavity.

While a specific size, shape, and configuration of the various components forming the article of footwear 100 are provided in FIGS. 1-3, they are illustrative in nature. Instead, it is contemplated that any size, shape, configuration and style may be associated with any one or more of the components and features of those components. For example, the upper 102 and/or the sole 104 may be and size, shape, and configuration. Further, the outsole 138 may be omitted or altered in various aspects. Further yet, as previously discussed, it is contemplated that one or more inserts may be provided in connection with direct bottomed footwear. The insert may be relatively positioned in a variety of ways. For example, the insert may be positioned between an outsole and a film layer. The insert may be positioned between a film layer and a foam material. The insert may be positioned between a foam material and the upper. A plurality of inserts may be positioned at a variety of locations and relative positions. Further yet, additional elements may be included, such as a sock liner, insole, or other components used in connection with an article of footwear. Additionally, it is contemplated that a primer, adhesive, or other bonding supplement may be used in connection with any of the components of the article of footwear 100 to aid in assembly.

Figure 4:
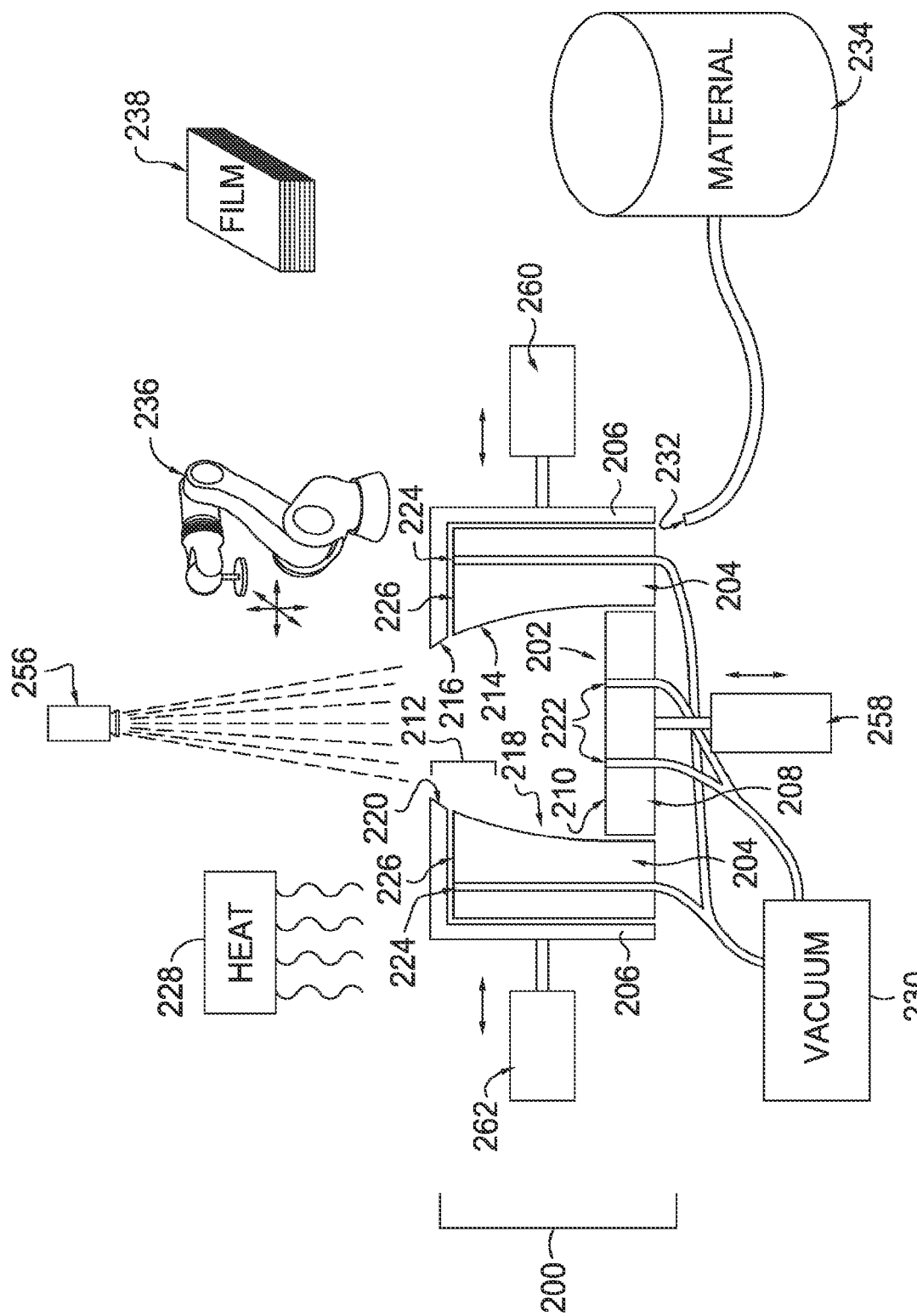
FIG. 4 depicts an exemplary system for manufacturing the article of footwear from FIG. 1, in accordance with aspects hereof.

FIG. 4 depicts an exemplary system having a mold 200 shown in cross-section for making an article of footwear, in accordance with aspects hereof. The mold 200 is comprised of an inner ring 204 (also referred to as an "inner ring mold" hereinafter), an outer ring 206 (also referred to as an "outer ring mold" hereinafter), and a bottom plate 208. However, while a specific configuration, such as an inner ring and an outer ring, is depicted in connection with the figures, it is contemplated that alternative tooling and configurations may instead be implemented. The system also includes a vacuum source 230. The vacuum source 230 is effective to generate a vacuum, such as negative pressure relative ambient conditions. The vacuum source 230 may generate the vacuum through a variety of methods, such as a fan, impeller, coanda, venturi, and the like. The vacuum source 230 is operatively coupled, such as through tubing, with one or more components, such as the bottom plate 208. The operative coupling between the vacuum source and the bottom plate 208 allows for vacuum to be drawn through the bottom plate 208 at one or more bottom plate vacuum ports 222 that extend through to a bottom plate top surface that forms a molding surface for the mold cavity. The bottom plate vacuum ports 222 allow for vacuum to be drawn through the mold cavity 202 and to pull in the polymeric film composition 132 to form a liner of the mold cavity 202.

In an optional configuration depicted in FIG. 4, and further illustrated in FIGS. 11-12 hereinafter, the vacuum source 230 (or a separate vacuum source) may be operatively coupled with the mold 200 in a manner to secure the polymeric film composition 132 prior to the film being drawn into the mold cavity 202. In this example, the vacuum source 230 is operatively coupled with the inner ring 204 to provide a vacuum at inner ring vacuum port 224, which will be discussed in greater detail at FIGS. 11-12.

Figure 13:
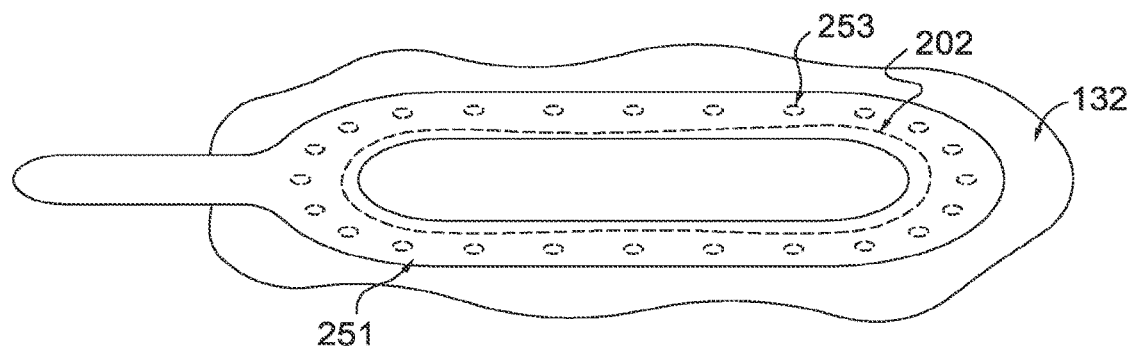
FIG. 13 depicts a fourth alternative example of a film secured to the mold of FIG. 5, in accordance with aspects hereof.

The system of FIG. 4 also includes a heat source 228. The heat source 228 is effective to heat the polymeric film composition 132 to aid in the polymeric film composition 132 being drawn into the mold cavity 202 by vacuum. The heat source 228 may be any heat source, such as a radiant heat source. The heat source 228 may operate with electrically resistive elements, infrared radiation (e.g., near and/or far range), and/or the like. For example, the heat source 228, as seen in FIG. 13, may be positioned in proximity to the polymeric film composition 132 and apply a flash of thermal energy to the polymeric film composition 132 to increase the temperature of the polymeric film composition 132 above ambient temperature. In some examples the temperature is raised to a temperature above ambient temperatures but below a melting temperature of the polymeric film composition 132. The increase in temperature allows for the polymeric film composition 132 to more easily comply with the mold cavity 202 as it is drawn in to the mold cavity 202. Easier compliance of the polymeric film composition 132 while being drawn allows the polymeric film composition 132 to conform to the features of the mold surfaces with minimized polymeric film composition 132 creasing and other deformations. Further, application of the thermal energy to the polymeric film composition 132 can reduce an amount of vacuum used to line the mold cavity 202 with the polymeric film composition 132.

As will be discussed in connection with FIGS. 7-14, a variety of configurations and techniques are contemplated for securing the polymeric film composition 132 to the mold 200 during the vacuum drawing of the polymeric film composition 132 into the mold cavity 202.

The system of FIG. 4 also depicted a robotic arm 236. The robotic arm 236 represents any conveyance mechanism (e.g., multi-axis robot, X-Y plane movement gantry). The robotic arm is effective to manipulate one or more tools and or one or more components in the system of FIG. 4. For example, the robotic arm may be effective, in an exemplary aspect, to position the polymeric film composition 132 on the mold 200 from a film source 238. The robotic arm may be adapted with a claw, vacuum pickup tool, adhesion tool, hook, and/or the like to secure the polymeric film composition 132, move the polymeric film composition 132, and then position the polymeric film composition 132 at the mold 200 for being drawn into the mold cavity 202. Additionally or alternative, the robotic arm 236 is effective to position the heat source 228 at an appropriate position relative the polymeric film composition 132 for heating the polymeric film composition 132. Further yet, the polymeric film composition 132 (or a variation thereof) may be effective to position the upper 102 relative to the mold 200 for the direct bottoming operation.

The film source 238 may be an inventory of films, such as the polymeric film composition 132, having varied characteristics. The varied characteristics may include varied visual characteristics, such as color, texture, reflectance, and the like. The film source 238 may also include an inventor of films have different physical attributes. For example, different compositions, different thicknesses, different sizes. For example, the film source 238 may include various sizes of polymeric film compositions that are sized appropriate for a size or style of footwear being manufactured.

A material source 234 is a source of the polymeric foam composition 130. The material source 234 may be comprised of various compositions that are mixed and interact as being injected into the mold cavity 202 by an injector 232. The material source 234 may be comprised of a plurality of sources, such as a separate source for different elements forming the polymeric foam composition 130.

A vision system 256 is provided with the system of FIG. 4. The vision system 256 is effective to capture an image or plurality of images (e.g., video) of the mold and one or more components. The vision system 256 may be used to ensure placement of components relative to the tooling or relative to other components. For example, the vision system 256 may be effective to aid in the pick and place operations performed by the robotic arm 236. Further yet, the vision system 256 may be effective to identify the tooling and therefore the appropriate processes and/or components to process. Additionally, the vision system 256 may be used to evaluate quality metrics and to adjust process parameters or processes as a result of the determinations.

Returning to the mold 200, a variety of mold surfaces are present in the mold cavity 202. For example, a first mold surface 210 is formed by a top surface of the bottom plate 208. A second mold surface 212 is formed by a combination of molding surfaces. For example, a medial sidewall 214 of the inner ring 204 and a medial sidewall 216 of the outer ring 206 may form the second mold surface 212. In different tooling configurations the second mold surface is formed from portions of the tooling that form the sidewalls of the sole. On the lateral side, a lateral sidewall 218 of the inner ring 204 and a lateral sidewall 220 of the outer ring 206 form a sidewall molding surface of the mold 200. The inner ring 204 is comprised of a top surface 226. The top surface 226 is a surface that supports the polymeric film composition 132 as it is drawn into the mold cavity to form a liner of the mold cavity. The top surface 226 is a location, in an exemplary aspect, of the inner ring vacuum port 224. In aspects depicted in FIGS. 9-10, the inner ring top surface 226 is a surface for positioning a compression ring 246 around a lip formed in the inner ring top surface 226 to secure the polymeric film composition 132 to the mold through a compression fit prior to drawing the polymeric film composition 132 into the mold cavity 202. Further yet, as will be depicted in FIGS. 7 and 8, the inner ring top surface 226 provides a securement location for one or more mold securements to extend through film apertures to secure the polymeric film composition 132 to the mold 200.

A bottom plate actuator 258 is provided to linearly move the bottom plate 208 in an inferior and superior direction relative to the article of footwear to be manufactured. The bottom plate actuator 258 may be a hydraulic, pneumatic, electric, or the like actuator. The bottom plate actuator 258 is effective to position the bottom plate at different vertical positions depending on the process being performed, the article being manufactured, and/or the materials being used. For example, as some polymeric compositions have different foaming reactions that have different volume changes resulting, a different height of the bottom plate 208 relative to a location of the upper 102 may be desired and therefore adjusted by the bottom plate actuator 258. Additionally, it is contemplated that the bottom plate 208 is positioned at a first height prior to injecting the polymeric foam composition 130 and then raised to a second height that is closer to the upper 200 after the polymeric foam composition 130 is injected. This changing of the bottom plate 208 after injection can be an effective mechanism to clear the injection run that supplies the material through the mold and/or to provide sufficient volume for injecting the material the length of the mold cavity with varied injections pressures without having the upper 102 interfere with the injection stream, for example.

Figure 16:
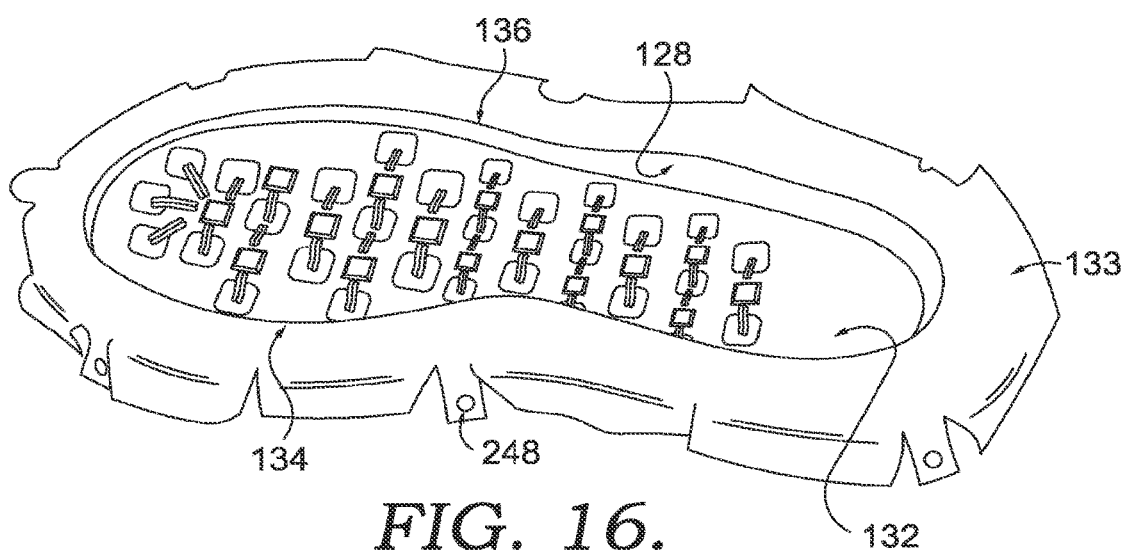
FIG. 16 depicts the film drawn into the mold cavity to form a liner, in accordance with aspects hereof.
Figure 17:
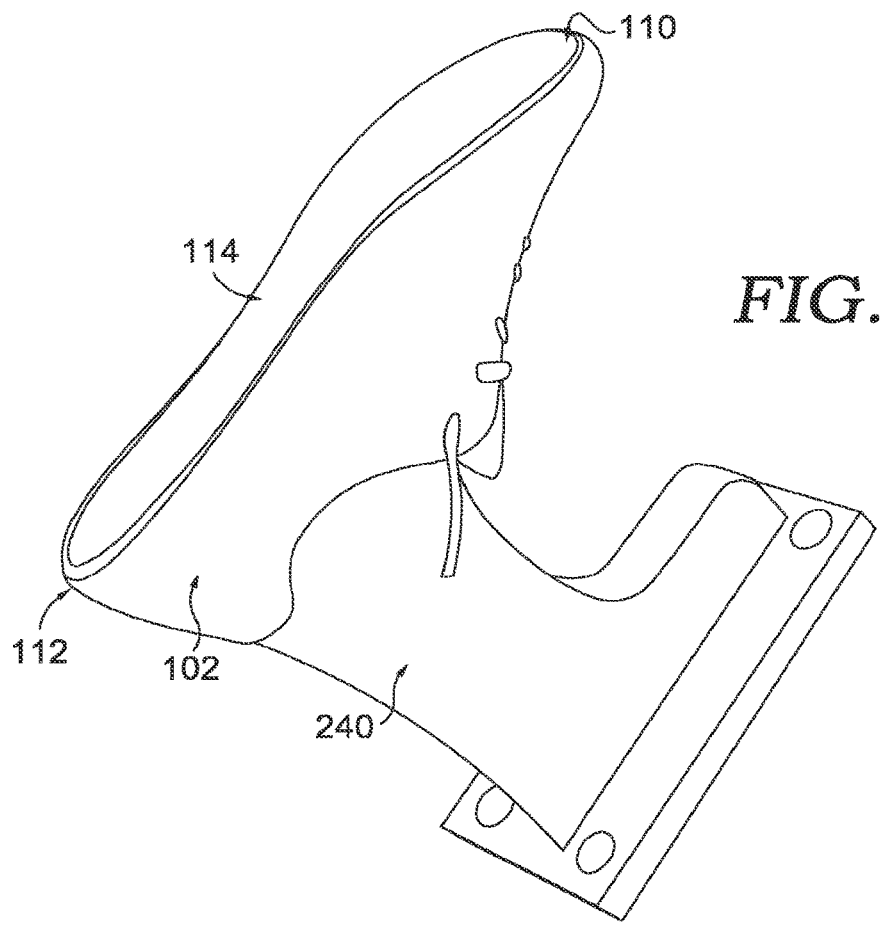
FIG. 17 depicts a lasted upper, in accordance with aspects hereof.

The system of FIG. 4 also includes ring actuators, such as the medial ring actuator 260 and a lateral ring actuator 262. The medial ring actuator 260 and the lateral ring actuator 262 may be any actuator, such as be a hydraulic, pneumatic, electric, or the like actuator. The ring actuators are effective to position the respective mold ring portion during a manufacturing process. For example, and as shown in FIGS. 16 and 17, the medial ring actuator 260 and the lateral ring actuator 262 are effective to secure the outer respective rings about the upper 102. The medial ring actuator 260 and the lateral ring actuator 262 move the respective outer rings of the mold to enclose the mold cavity with the plantar portion of the lasted upper 102. As the injected polymeric foam composition 130 expands during foaming, the mold 200 forms the polymeric foam composition into a net-sized, shape that is mechanically engaged with the upper 102 because the polymeric foam composition 130 is enclosed in the mold cavity after the medial ring actuator 260 and the lateral ring actuator 262 move the outer rings into contact with the upper 102.

The mold 200 is contemplated that include the inner ring 204 and optionally the outer ring 206. Further, as will be discussed in greater detail hereinafter, one or more polymeric film composition securements are contemplated. The film securements include, but are not limited to pins, a compression ring, a magnetic ring or plate, and/or a vacuum port. It is understood that the inner ring 204 in combination or individually with the outer ring 206 may form the mold 200. When in combination as depicted in FIG. 4, the outer ring 206 slidably engages with the inner ring 204 to position the lateral sidewall 220 and the medial sidewall 216 in appropriate positions to secure the upper and to form the exposed regions of the footwear sidewall. This movement of the outer ring 206 therefore presents a molding surface at an appropriate position and it secures and forms a seal around the lasted upper for the injection of the polymeric foam composition. In aspects where the outer ring 206 is omitted, it is contemplated that the mold may still secure and seal around a lasted upper with a variety of techniques, such as a split inner ring that is able to close around an upper positioned in a mold cavity, as discussed herein with respect to the outer ring.

The various film securements will be discussed in detail in FIGS. 7-14B hereinafter. However, in general, the various film securement configurations are effective to secure a polymeric film composition over a mold cavity to allow the polymeric film composition to be drawn into the mold cavity and to then form a liner of the mold cavity. Therefore, variations on positions of elements comprising the film securement are contemplated.

While specific components are depicted in FIG. 4, it is understood that any of the components may be omitted. Further, it is contemplated that any number of a listed component may be used in a system. Further yet, the components of FIG. 4 are exemplary in nature and are not limiting.

Figure 5:
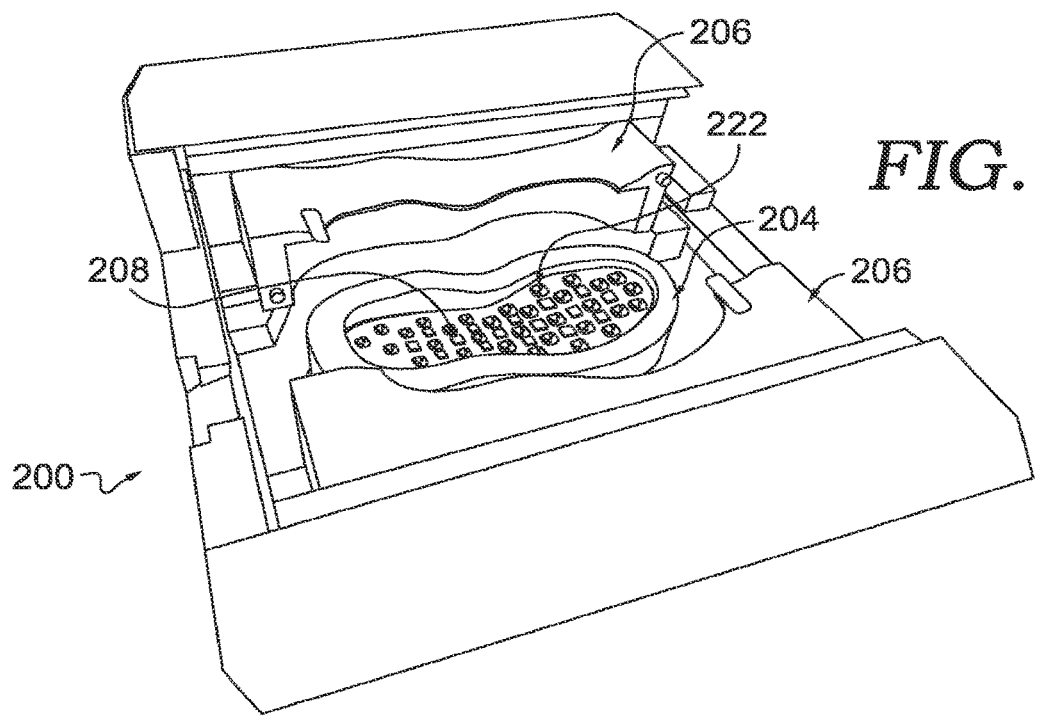
FIG. 5 depicts a mold for forming the article of footwear from FIG. 1, in accordance with aspects hereof.

FIG. 5 depicts the mold 200 having the outer ring 206, the inner ring 204, and the bottom plate 208 exposed, in accordance with aspects hereof. The mold 200 in FIG. 5 is in a configuration prepared for a direct bottoming process, as will be sequentially show in illustrative nature in the following figures.

Figure 6:
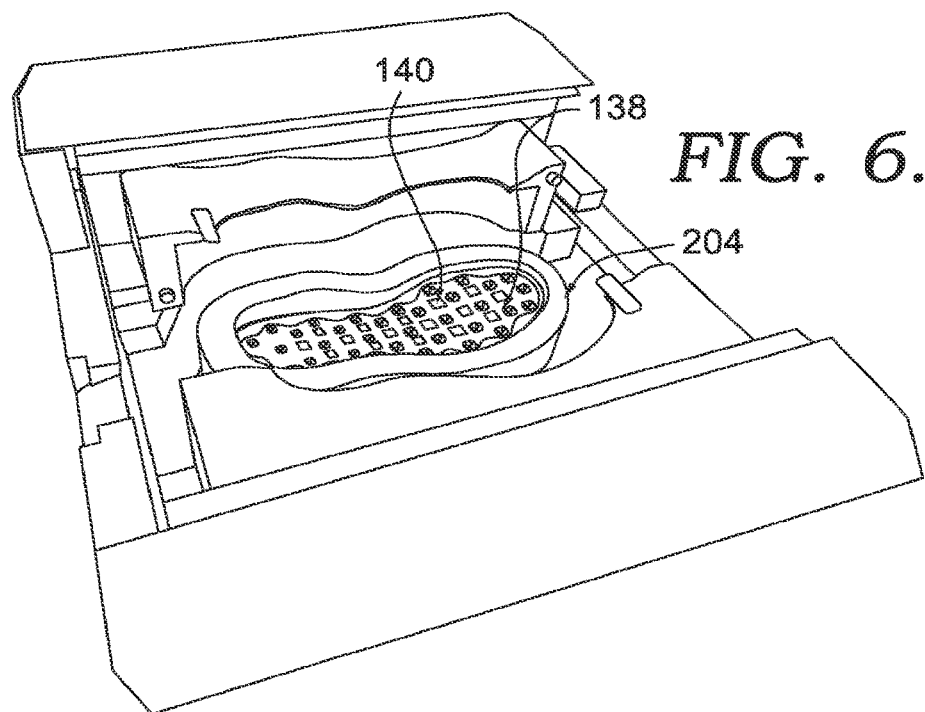
FIG. 6 depicts the mold from FIG. 5 having an outsole positioned therein, in accordance with aspects hereof.

FIG. 6 depicts the mold 200 with the outsole 138 placed on the bottom plate 208 within the inner ring 204, in accordance with aspect hereof. In this example, the outsole aperture 140 aligns with the bottom plate vacuum port 222 allowing for a conduit through which vacuum may reach and affect the polymeric film composition 132. It is contemplated that an adhesive or other bonding agent may be applied to the outsole 138 to aid in a bond between the outsole 138 and the polymeric film composition 132. That adhesive or bonding agent may be applied at this step prior to forming the polymeric film composition 132 into a liner that is vacuum secured to the outsole 138. This vacuum securing may aid in bonding the outsole 138 and the polymeric film composition 132.

Figure 7:
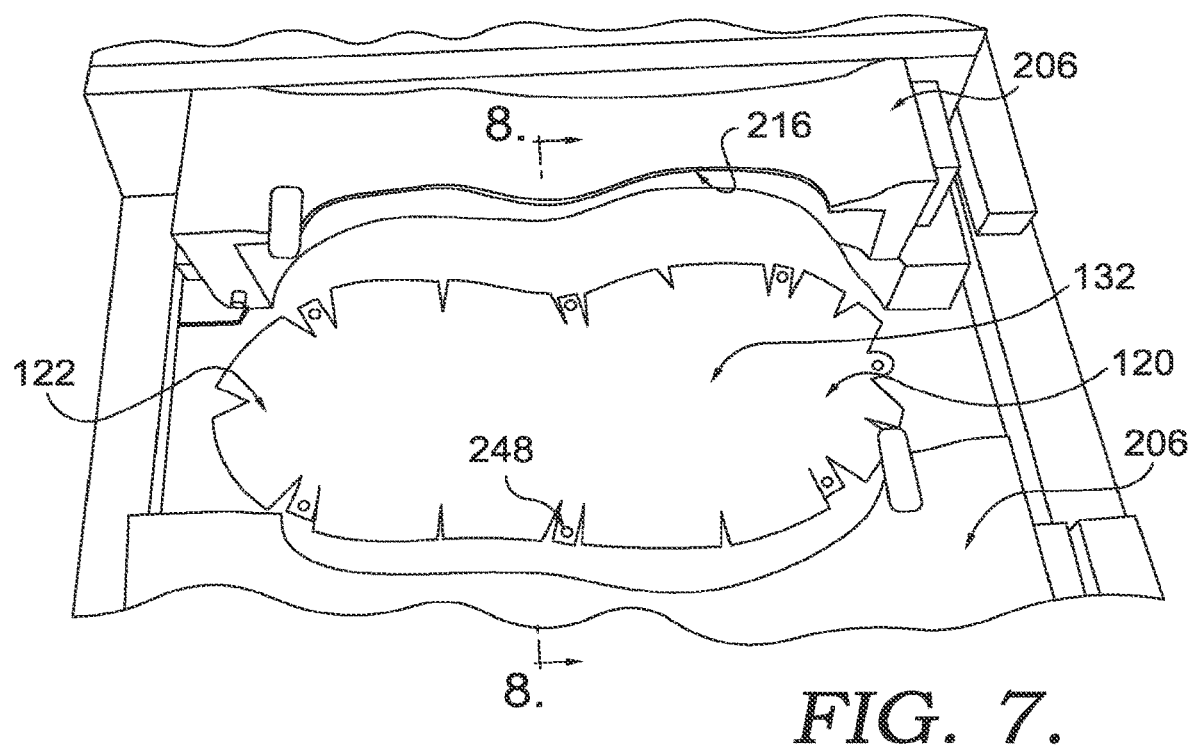
FIG. 7 depicts a first alternative example of a film secured to the mold of FIG. 5, in accordance with aspects hereof.

FIG. 7 depicts a first configuration for securing the polymeric film composition 132 to the mold for being drawn into the mold cavity to form a liner, in accordance with aspects hereof. In this first configuration, a plurality of mold securements 250, as best seen in the cross section of FIG. 8, extend through film apertures 248 of the polymeric film composition 132. This mechanical engagement by the mold securements 250 anchors the polymeric film composition 132 to the mold 200 as it is drawn into the mold cavity. Without an anchoring, regardless of type of anchor configuration, the polymeric film composition 132 may be pulled beyond the top surface of the mold and allow for a vacuum seal to be broken, which would negate the effectiveness of the vacuum to pull the polymeric film composition 132 into the mold cavity as a liner.

Figure 8:
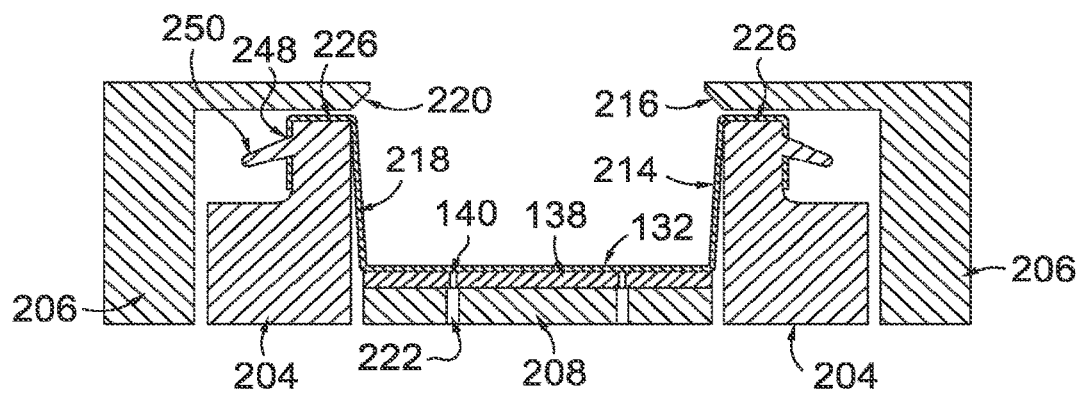
FIG. 8 depicts a cross-sectional view of the first example of a film secured to the mold from FIG. 7 after the film has been drawn into the mold cavity as a liner, in accordance with aspects hereof.

FIG. 8 depicts a cross section along line 8-8 of FIG. 7 after being drawn by vacuum to form a liner, in accordance with aspects hereof. The polymeric film composition 132 extends from the top surface 226 along the lateral sidewall 218, across the outsole 138 on the bottom plate 208 to the medial sidewall 214 and up to the inner ring top surface 226 on the medial side. The polymeric film composition 132 may be formed with the film apertures 248 at predefined locations that ensure a consistent tension across the mold cavity based on a known distance between the pluralities of film apertures 248. Alternatively, the film apertures 248 may be formed by the mold securement 250. For example, the mold securement 250 may puncture the polymeric film composition 132 at a location selected by an operator. In this way, the amount of tension resulting in the polymeric film composition 132 as it extends across the mold cavity may be adjusted at the time of securement to accommodate variations in materials, sizes, styles, and the like. Further, it is contemplated that some of the film apertures 248 may be pre-formed and others are formed by contact with their respective mold securement 250.

The mold securement 250 may be a pin, a hook, or any other protrusion extending from a portion of the mold 200 to which the polymeric film composition 132 is proximate (e.g., contacts, near) and that is outside the mold cavity 252. The mold securement 250 may be integrally formed with the mold 200 or it may be added after initial tooling generation is performed. For example, one or more pins may be inserted into the mold 200 to serve as mold securements 250.

FIG. 8 depicts the interaction of the inner ring 204 and the outer ring 206. As the polymeric film composition 132 turns from the inner ring sidewalls, such as the medial sidewall 214, to the top surface 226, the sole sidewall molding surface is then formed by the outer ring 206 at the medial sidewall 216. It is this medial sidewall 216 that forms the medial exposed portion 135 on the sole 104. Similarly, the lateral sidewall 220 forms the lateral exposed portion 137 of the sole 104. Having the inner ring 204 defining the mold surfaces supporting the liner formed by the polymeric film composition 132 and the outer ring defining the mold surface of exposed portion, a film edge may be formed on the sidewall away from the upper 200, in an exemplary aspect.

It is understood that the dimensions of the outer ring sidewall surfaces may be adjusted to change a width of exposed portion on the sole 104 sidewall. For example, if a larger exposed portion is intended, the size of the outer ring sidewall may be increase. Conversely, if the size of the exposed portion is intended to be decreased, the size of the outer ring sidewall is decreased.

Figure 9:
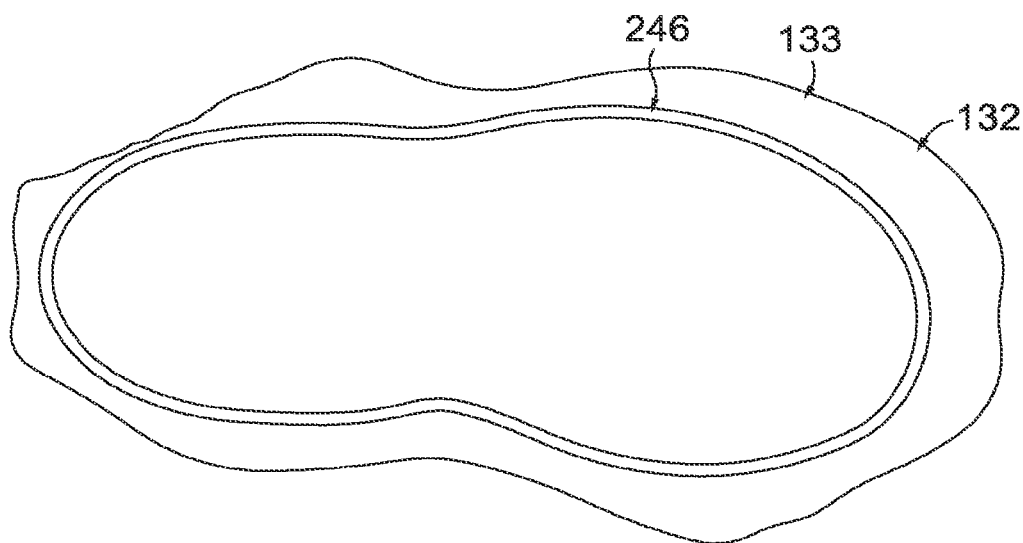
FIG. 9 depicts a second alternative example of a film secured to the mold of FIG. 5, in accordance with aspects hereof.

FIG. 9 depicts a simplified securement of the polymeric film composition 132 to the mold using compression, in accordance with aspects hereof. Specifically, a compression ring 246 is formed to compress the polymeric film composition 132 around a perimeter element, such as the depicted lip, of the top surface 226. The compression ring 246 is formed from a material, such as steel, aluminum, polytetrafluoroethylene, and the like. Because aspects contemplate heating the polymeric film composition 132, the compression ring 246 is formed from a material that tolerates thermal cycles with temperatures exceeding 200 Celsius. Not only should the compression ring 246 have tolerance for temperatures above 200 Celsius, but the compression ring 246 should not degrade or deform with the repeated thermal cycles. The compression ring 246 is sized to encircle the top surface 226 while also capturing and maintaining the polymeric film composition 132 in the appropriate position. Therefore, appropriate sizing of the compression ring 246 that remains consistent through manufacturing cycles ensures a consistent securement of the polymeric film composition 132.

Because the compression ring 246 extends around the perimeter in the aspects provided, the securements of the polymeric film composition 132 is uniform around the mold cavity. Lack of uniformity in the securement can result in creases or other deformations of the polymeric film composition 132 as it is drawn into the mold cavity as a liner. Further, the polymeric film composition 132 may be provided an intended amount of tension or sag prior to being secured. For example, a predetermined amount of the polymeric film composition 132 may extend into the mold cavity prior to the placement of the compression ring 246. The excess polymeric film composition 132 in the mold cavity prior to securement may limit an amount of elongation that is needed from the polymeric film composition 132 to form the liner of the mold cavity.

Figure 10:
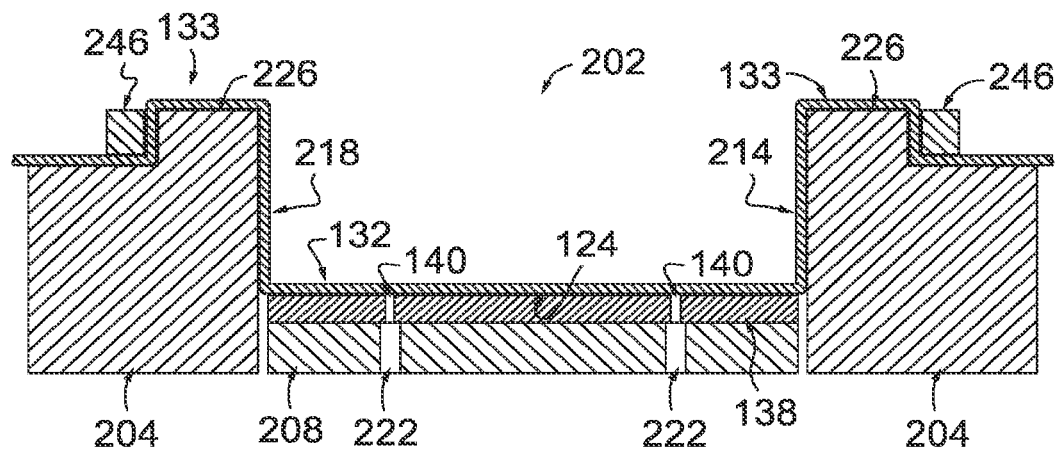
FIG. 10 depicts a cross-sectional view of the second example of a film secured to the mold from FIG. 9 after the film has been drawn into the mold cavity as a liner, in accordance with aspects hereof.

FIG. 10 depicts a cross section of FIG. 9 after the polymeric film composition 132 has been drawn down as a liner of the mold cavity 202, in accordance with aspect hereof. The compression ring 246 compresses the polymeric film composition 132 between the inner ring 204 at the top surface 226. As the polymeric film composition 132 transitions from the sidewalls, such as the lateral sidewall 218 to the top surface 226, the trimmed portion 133 is formed from the polymeric film composition 132. The trimmed portion 133 is the portion of the polymeric film composition 132 that is not joined with the polymeric foam composition 130 and that will be trimmed as depicted in FIG. 19 hereinafter.

Figure 11:
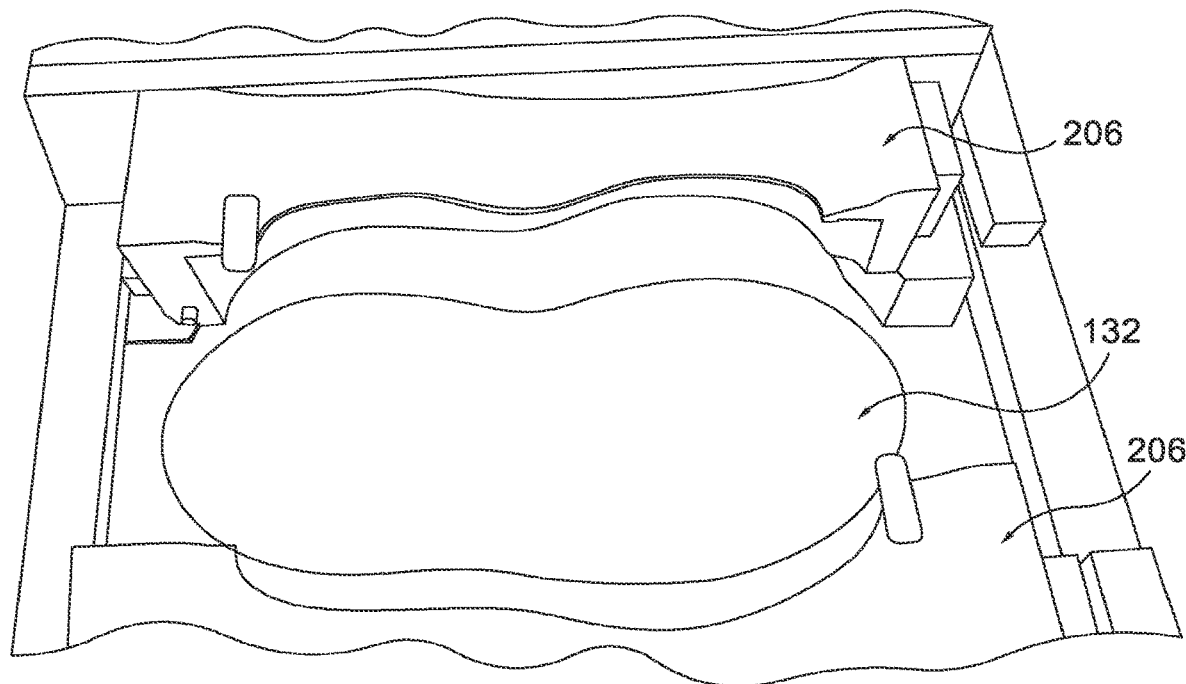
FIG. 11 depicts a third alternative example of a film secured to the mold of FIG. 5, in accordance with aspects hereof.

FIG. 11 depicts an additional polymeric film composition 132 securement option over the mold cavity, in accordance with aspects hereof. In this example, a vacuum pressure is applied to the polymeric film composition 132 outside of the mold cavity 202 and prior to the polymeric film composition 132 being drawn into the mold cavity 202 to form a liner. A series of apertures extend through the inner ring as vacuum ports 224. The vacuum apertures are conduits for vacuum that apply aid in securing the polymeric film composition 132 to the top surface 226.

Figure 12:
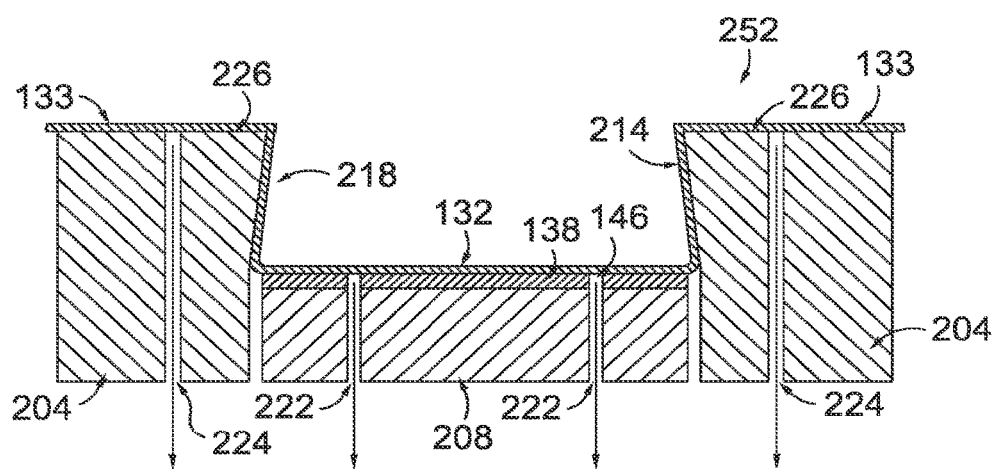
FIG. 12 depicts a cross-sectional view of the third example of a film secured to the mold from FIG. 11 after the film has been drawn into the mold cavity as a liner, in accordance with aspects hereof.

FIG. 12 depicts a cross section of FIG. 11 after the polymeric film composition 132 has been drawn down as a liner of the mold cavity 202, in accordance with aspects hereof. In this example, it is contemplated that the polymeric film composition 132 is positioned over the mold cavity and concurrently or subsequently a vacuum is drawn through the vacuum ports 224 that create a securement force by vacuum at the top surface 226 of the polymeric film composition 132. Once the polymeric film composition 132 is secured to the mold 200 by the vacuum port 224, the bottom plate vacuum ports 222 may draw a vacuum there through to elongate and pull the polymeric film composition 132 into the mold cavity to form a liner. While the polymeric film composition 132 is being pulled down to form a liner, the polymeric film composition 132 is secured at the top surface by continued vacuum from the vacuum port 224.

The vacuum ports may be positioned as a plurality of ports extending around the mold cavity perimeter. The vacuum ports 224 may be spaced every 1 mm, 2 mm, 3 mm, 4 mm, 5 mm, 6 mm, 7 mm, 8 mm, 9 mm, or more. Depending on a size of the vacuum port 224, the amount of vacuum pressure, the material characteristics, and the mold cavity size, the positioning and spacing of the vacuum ports may be adjusted. Further, it is contemplated that the vacuum ports 224 are positioned closer together at regions of the mold cavity having a longer sidewall surface. As a greater elongation may occur for the longer sidewall pull, a stronger securement is contemplated. For example, in a heel region having a thicker polymeric foam composition from the ground-facing surface to the upper-facing surface thank in a toe region, the perimeter of the mold cavity near the heel region has a higher concentration of vacuum ports 224 than in the perimeter of the toe region, for example.

Aspects herein contemplated a variable vacuum securement force generated through the vacuum ports 224. As will also be discussed with respect to a magnetic securement technique provided in FIGS. 13-14 hereinafter, the variable vacuum securement force may ensure unintended elongation of the polymeric film composition 132 is limited by allowing intentional slippage of the polymeric film composition 132 along the inner ring 204 during the drawing of the polymeric film composition 132 in to the mold cavity as a liner. For example, one or more of the vacuum ports used for securing the polymeric film composition 132 may reduce a vacuum pressure applied at different processes of the operation. In an example, as the polymeric film composition 132 is heated, a first securement force is generated by the vacuum ports 224. At least partially through the vacuum draw of the polymeric film composition 132 into the mold cavity, a second securement force is generated by the vacuum ports 224. The second securement force is less than the first securement force to allow slippage of the polymeric film composition 132 along the inner ring 204. This slippage allows for a formation of a liner of the mold cavity while also preventing over elongation of the polymeric film composition that could affect a visual characteristic of the polymeric film composition. Examples of affected visual characteristics include, but are not limited to, a distortion or other deformation of a graphic or text element on the polymeric film composition 132. Another example includes a dimensional texture on the polymeric film composition 132 that is muted or otherwise lessened by over elongation. As such, aspects contemplate allow for intentional slippage of at a least a portion of a polymeric film composition relative to the mold to limit unintended visual characteristic effects.

Figure 14A:
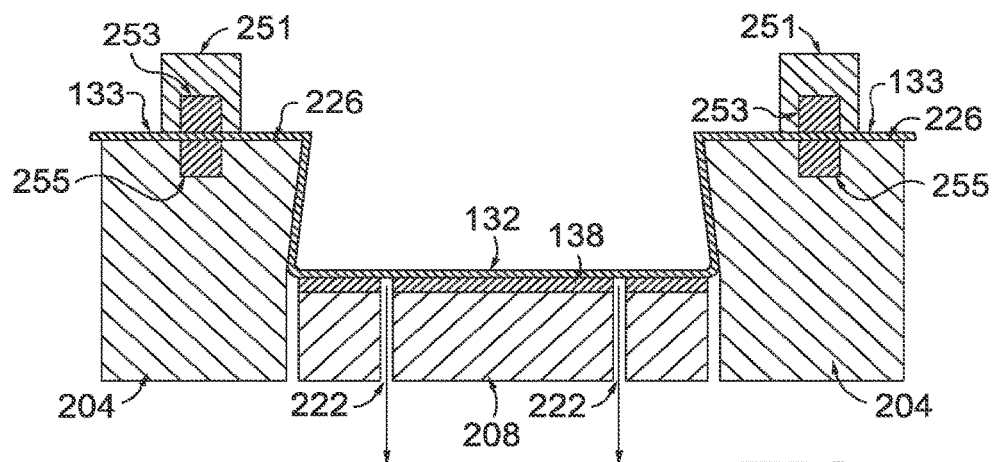
FIG. 14A depicts a cross-sectional view of the fourth example of a film secured to the mold from FIG. 13 after the film has been drawn into the mold cavity as a liner, in accordance with aspects hereof.

FIG. 13 depicts a fourth exemplary technique for securing the polymeric film composition 132 to the mold using magnetic attraction between a magnetic ring 251 and the inner ring 204, in accordance with aspects hereof. The magnetic attraction may be generated through any combination of magnetic force, such as magnets 253 incorporated in the magnetic ring 251, magnets 255 (as seen in FIG. 14A hereinafter) incorporated in the inner ring 204, magnetized magnetic ring 251, and/or magnetized inner ring 204. Further, the magnetic attraction may be magnetic materials and/or electromagnetic systems that generate a magnetic force in response to electrical input.

The magnetic ring 251 may be any shape. In an exemplary aspect the magnetic ring 251, as depicted, is a ring-like structure that is effective to cover at least the edge of the inner ring 204 that defines the mold cavity 202. For example, the magnetic ring may have a width from an interior perimeter (e.g., central aperture) to an exterior perimeter of 5 mm, 10 mm, 15 mm, 20 mm, 25 mm, and greater. The greater the width, the more universal the magnetic ring 251 may be for different sized molds and different styles of molds. Therefore, a universal magnetic ring 251 configuration all for the number of magnetic ring 251 variations to be limited to increase efficiency and reduce tooling inventory. However, it is contemplated that the magnetic ring 251 includes at least one aperture, in an exemplary aspect, that allows for air to pass through the magnetic ring 251, such as in a central region over the mold cavity 202. This aperture allows for pressure to be equalized to ambient pressure on a top surface of the polymeric film composition 132 as the polymeric film composition 132 is drawn into the mold cavity 202 to form a liner. The aperture extending through the magnetic ring 251 allows a pressure differential to be formed across the polymeric film composition 132 as the vacuum is drawn through the bottom plate 208, as seen in FIG. 14A.

The magnetic ring 251 may be constructed from any material. Similar to the compression ring 246, the magnetic ring 251 is formed from a material, such as steel, other ferrous metals, aluminum, polytetrafluoroethylene, other polymers, and the like. Because aspects contemplate heating the polymeric film composition 132, the magnetic ring 251 is formed from a material that tolerates thermal cycles with temperatures exceeding 200 Celsius. Depending on the magnetic attraction configuration, the magnetic ring 251 may be formed from a ferrous material or at least incorporate a ferrous material. For example, if a permanent magnet, electric magnet, or other source of magnetic energy is incorporated with the inner ring 204, the magnetic ring 251 may be a passive component that is attracted to the magnetic energy source within the inner ring 204. Additionally or alternatively, the magnetic ring 251 may include a magnetic energy source, such as a permanent magnet, an electromagnet, or other magnetic energy source. Regardless of the magnetic energy source and position, it is contemplated that a compressive force is generated between the magnetic ring 251 and the ring 204 around the perimeter of the mold cavity 202 using magnetic attraction between the magnetic ring 251 and the ring 204.

As depicted in FIG. 13, a plurality of the magnets 253 are positioned around a circumference of the magnetic ring 251 and within the width of the magnetic ring between the exterior perimeter and the center aperture. Each of the magnets may have a common polarity orientation within the magnetic ring 251 to allow for varied positioning and a standardized attraction to a mold. Alternatively, it is contemplated that the polarity orientation of each of the magnets 253 may be varied to provide a self-alignment characteristic of the magnetic ring 251 to the underlying mold. If magnets, such as the plurality of magnets 253, are incorporated within the magnetic ring 251, any number of magnets may be used. For example, 4, 6, 8, 10, 12, 14, or any number of magnets may be incorporated. Further, it is contemplated that an even spacing or an irregular spacing may be implemented in the positioning of the magnets in the magnetic ring 251. A uniform spacing between the magnets 253 may aid in providing a uniform compression around a perimeter. An irregular positioning of the magnets 253 may be leveraged to achieve greater magnetic compressive force in a specific location, such as where the compressed polymeric film composition 132 is more prone to elongation. As will be depicted in FIG. 14B, it is also contemplated that the magnets may be omitted from the magnetic ring in some aspects. As the magnetic ring may be constructed having a ferrous metal, magnetic energy source (e.g., permanent magnet or electromagnet) may be in the mold itself and generate a compressive force on the polymeric film composition 132 through a magnetic attraction to the magnetic ring containing a ferrous metal.

FIG. 14A depicts a cross section view of the film securement using the magnetic ring 251 of FIG. 13, in accordance with aspects hereof. Similar to the aspects previously discussed with connection to FIGS. 10 and 12, the polymeric film composition 132 is secured during a vacuum draw into the mold cavity formed at least by the ring 204 and the bottom plate 208. At the top surface 226 of the ring 204 the magnetic ring 251 compresses the polymeric film composition 132. The compressive force is generated through a magnetic attraction. The magnetic attraction may be generated as a result of attractive polarities of opposing magnets 255 in the ring 204 and the magnets 253 of the magnetic ring 251. Or, as previously discussed, one or more of the ring 204 and the magnetic ring 251 may be attracted to a magnetic energy source. For example, the ring 204 and/or the magnetic ring 251 may include a ferrous material (or other magnetically attracted material) that is attracted to an opposing magnetic energy source.

The magnets 255 may be positioned at any location of the mold, but in the illustrated example the magnets 255 are incorporated at the top surface 226. The positioning of the magnets 255 may be aligned with the positioning of the magnets 253 of the magnetic ring 251. This coordination and alignment of the magnets 255 and the magnets 253 allows for an efficient use of magnetic energy potential between the magnets 255 and the magnets 253.

Figure 14B:
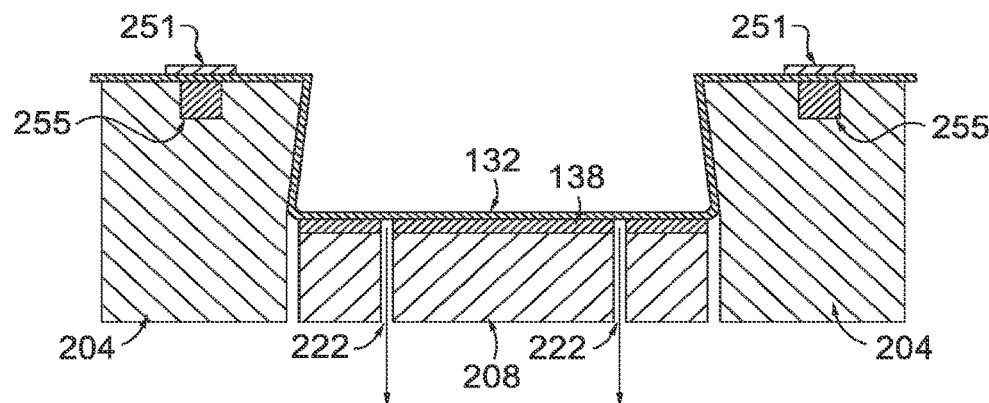
FIG. 14B depicts an alternative cross-sectional view of a the magnetic ring after the film has been drawn into the mold cavity as a liner, in accordance with aspects hereof.
Figure 15:
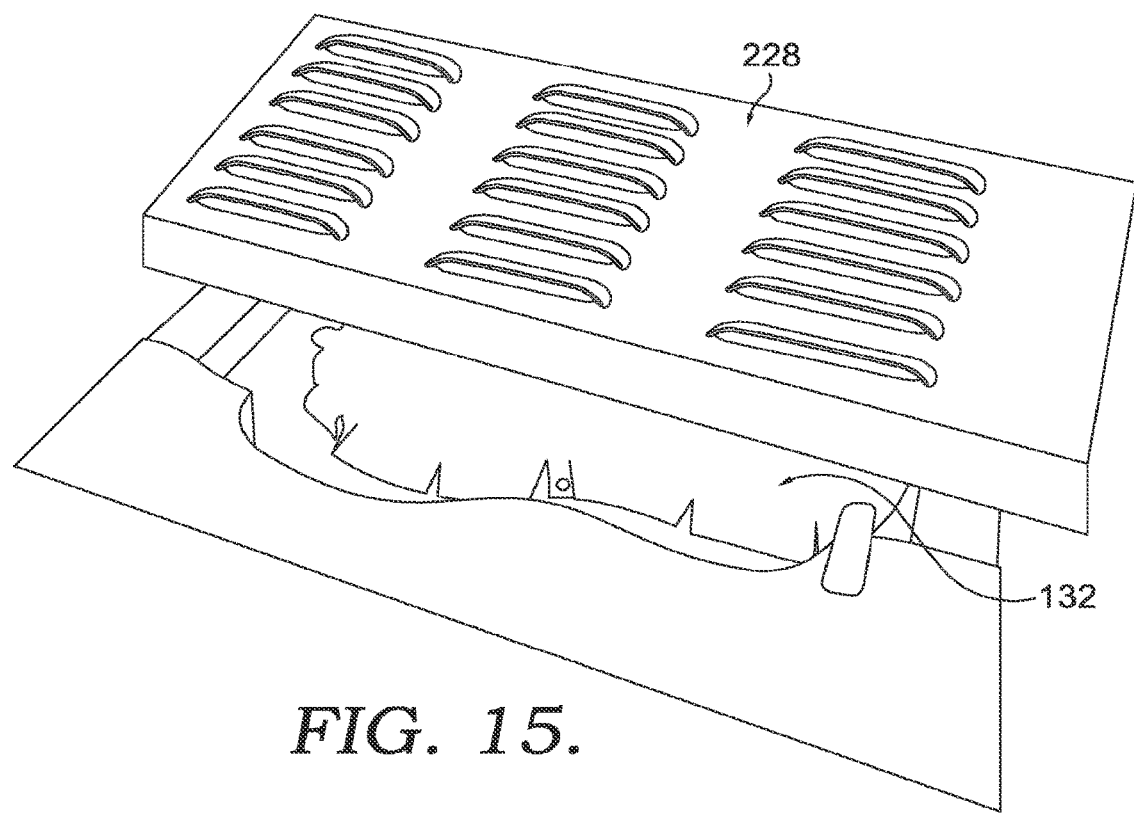
FIG. 15 depicts a heater heating the film, in accordance with aspects hereof.

Similar to the vacuum pressure securement technique of FIGS. 11-12, it is contemplated that the magnetic securement technique of FIGS. 13-15 may be applied as a variable securement. If the magnetic compression is generated, at least in pa, through an electromagnetic source, the force generated by the electromagnetic source may be adjusted during a process. For example, it is contemplated that the magnetic ring 251 may secure the polymeric film composition 132 to the mold prior to heating the polymeric film composition 132. During the heating process a first compression is generated between the magnetic ring 251 and the mold. During a vacuum draw process, a second compression may be generated between the magnetic ring 251 and the mold. The first compression may be greater than the second compression to allow for the polymeric film composition 132 to not only elongate during the vacuum draw, but to also slidably move between the magnetic ring 251 and the mold. Selectively adjusting a timing and/or positioning of compressive force applied to the polymeric film composition 132 may effectively limit unintended deformation of the polymeric film composition 132. Examples include the polymeric film composition having a graphic or other element (text) visible on the surface such that an irregular or over-elongation distorts the visual impression of the polymeric film composition. Another example includes a polymeric film composition having as dimensional texture. Excessive elongation of the dimensionally textured polymeric film composition can reduce and distort the dimensional texture. Consequently, aspects contemplate reducing a compressive force between the magnetic ring 251 and the mold through an adjustment of magnetic force generated, such as a force generated by an electromagnet. The adjustment of compression, in this example, allows for intentional slippage and limited elongation of the polymeric film composition 132.

An exemplary use of the magnetic ring 251 technique includes positioning the polymeric film composition 132 over the mold cavity 202. The magnetic ring 251 is then positioned over the polymeric film composition 132 and in proximity to the mold. A magnetic attraction between the magnetic ring 251 and the mold results in a compression of the polymeric film composition 132 between the mold and the magnetic ring 251 that secure the polymeric film composition 132 for being drawn into the mold cavity 202. After the polymeric film composition 132 is drawn into the mold cavity 202, the magnetic ring 251 may be removed from the polymeric film composition 132. The upper may then be positioned at the mold for a direct bottoming operation.

FIG. 14B depicts an alternative configuration for the magnetic ring 251 in a cross section, in accordance with aspects hereof. Specifically, the magnetic ring 251 of FIG. 14B is constructed from a ferrous metal, such as steel. Magnetic ring may be cut from the materials, such as a sheet of steel. The magnetic ring may have a thickness of 1-4 mm in a first aspect and a thickness of 2-3 mm in a second aspect. The ferrous magnetic ring is attracted or more magnetic energy sources (e.g. permanent magnet, electromagnet) at the mold, such as the ring 204. The magnetic energy source may be countersunk into the top surface of the ring 204. The magnetic ring 251 may be any shape. In an exemplary aspect, the magnetic ring 251 has an exterior perimeter that is at least as big and shape to extend outside of the mold cavity at the top surface of the inner ring 204. Stated differently, the size and shape of the inner ring 204 is sufficient to compress the polymeric film composition 132 at the top surface of the ring 204.

FIG. 15 depicts the heat source 228 heating the polymeric film composition 132, in accordance with aspects hereof. For example, after securing the polymeric film composition 132 to the mold by any method, such as those methods provided in FIGS. 9-14 and prior to applying a vacuum to draw the polymeric film composition 132 into the mold cavity, the heat source 228 may heat the polymeric film composition 132. Once heated, the polymeric film composition 132 is more prone to elongation by a vacuum draw through the mold cavity. Further, as a result of heating by the heat source 228, the polymeric film composition 132 may be more compliant to the mold surfaces to result in a higher resolution of detail that is captured by the polymeric film composition 132 from the mold surfaces and molded into sole 104.

FIG. 16 depicts the polymeric film composition 132 drawn down into the mold cavity to form a liner of the mold cavity, in accordance with aspects hereof. While film apertures 248 are depicted, it is understood that any securement technique may be implemented and the illustrated technique is not limiting. With the polymeric film composition 132 drawn down by vacuum through the bottom plate, the medial film edge 134 and the lateral film edge 136 are exposed and represent a location where trimming will be performed to create the trimmed portion 133. In this step, the vacuum may be maintained for a predefined period of time to ensure acceptable contact between the polymeric film composition 132 and the mold surfaces. Alternatively, the vacuum may cease once the polymeric film composition 132 reaches a predefined temp that is lower than at the start of applying the vacuum to draw the polymeric film composition 132 down as a liner. Additionally, the vacuum may be maintained through subsequent processing steps, such as injection of the polymeric foam composition.

FIG. 17 depicts a step of applying the upper 102 to a last 240 in a step commonly referred to as lasting, in accordance with aspects hereof. The last 240 is a tool that provides a defined shape to the upper 102 such that after the direct bottoming process, the upper 102 maintains a similar shape, at least in part, as a result of the engagement with the resilient sole. The plantar region 114 is prominently illustrated in this example. As discussed, the plantar region 114 will form the engagement surface for the sole during the direct bottoming process to follow.

Figure 18:
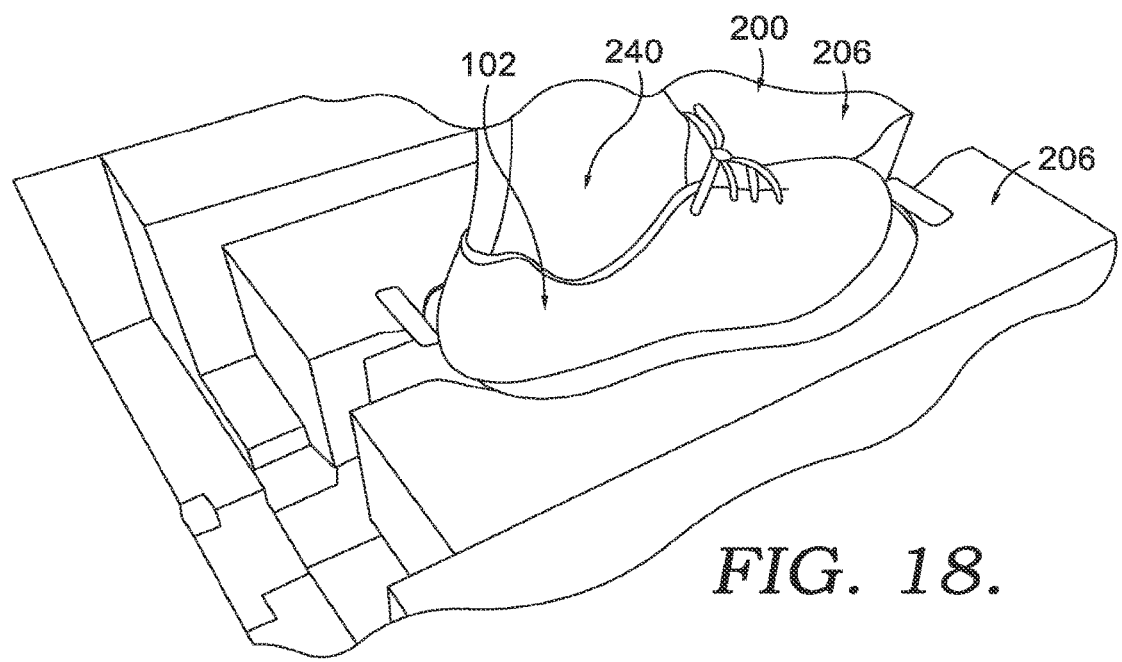
FIG. 18 depicts the lasted upper of FIG. 17 positioned at the mold of FIG. 16, in accordance with aspects hereof.

FIG. 18 depicts the lasted upper 102 being positioned relative to the mold 200, in accordance with aspects hereof. The outer ring 206 is separated by the actuators provided in FIG. 4. The slit outer ring configuration allows for the positioning of the upper 102 in the mold 200 as intended to expose the plantar region to the molding cavity for direct bottoming to occur.

FIG. 19 depicts the outer ring 206 in the closed configuration for direct bottoming to the lasted upper 102, in accordance with aspects hereof. When in the closed configuration, the outer ring 206 compresses the lasted upper to form a seal at the transition from the sole to be direct bottomed and the upper 102. The injector 232 is positioned at the mold to inject a composition into the mold cavity that will foam and be the polymeric foam composition 130 discussed herein. While not depicted, it is contemplated that after the injector 232 injects the polymeric foam composition 130, the bottom plate raises to obscure the channel through which the polymeric foam composition 130 passed to reach the mold cavity. This obstruction seals the mold cavity to contain the expanding polymeric foam composition 130 within the mold cavity defined by the mold 200 and the secured upper 102. As provided previously the polymeric foam composition 130 and the polymeric film composition 132 may bond, mechanically and/or chemically as the polymeric foam composition 130 cures in the mold cavity in contact with the polymeric film composition 132.

Figure 20:
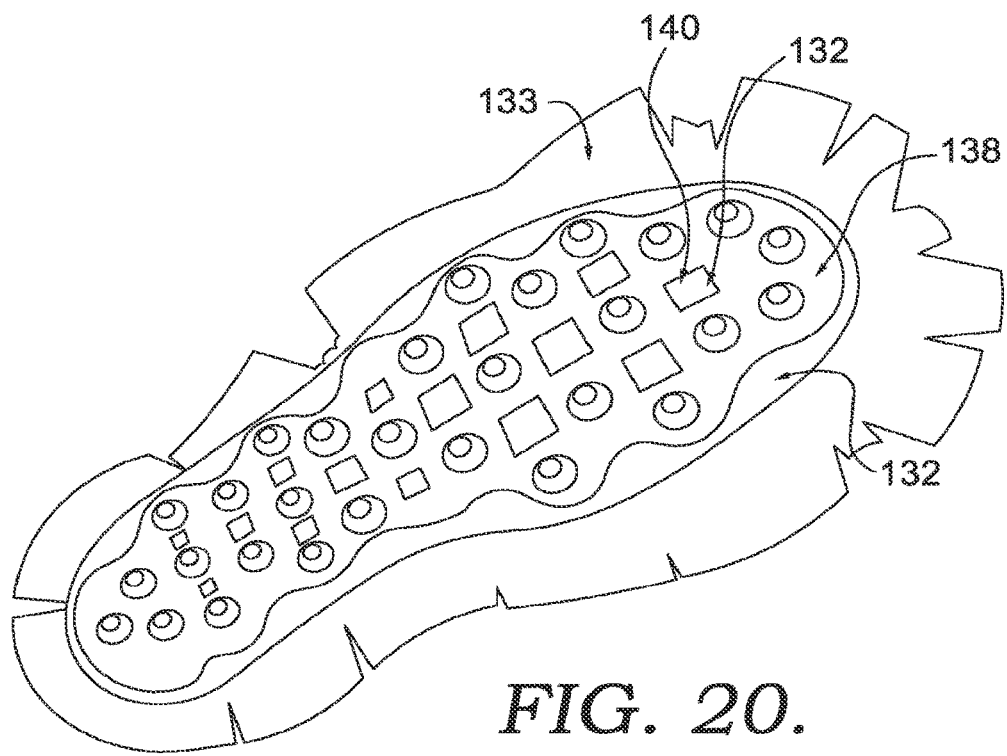
FIG. 20 depicts the article of footwear created at the FIG. 19 with a portion of the film to be trimmed, in accordance with aspects hereof.

FIG. 20 depicts a ground-contacting surface of the article of footwear 100 following the direct bottoming operation of FIG. 19, in accordance with aspects hereof. Depicted is the trimmed portion 133 of the polymeric film composition 132 prior to being trimmed. Also depicted is the polymeric film composition 132 as exposed through the outsole apertures 140 of the outsole 138.

Figure 21:
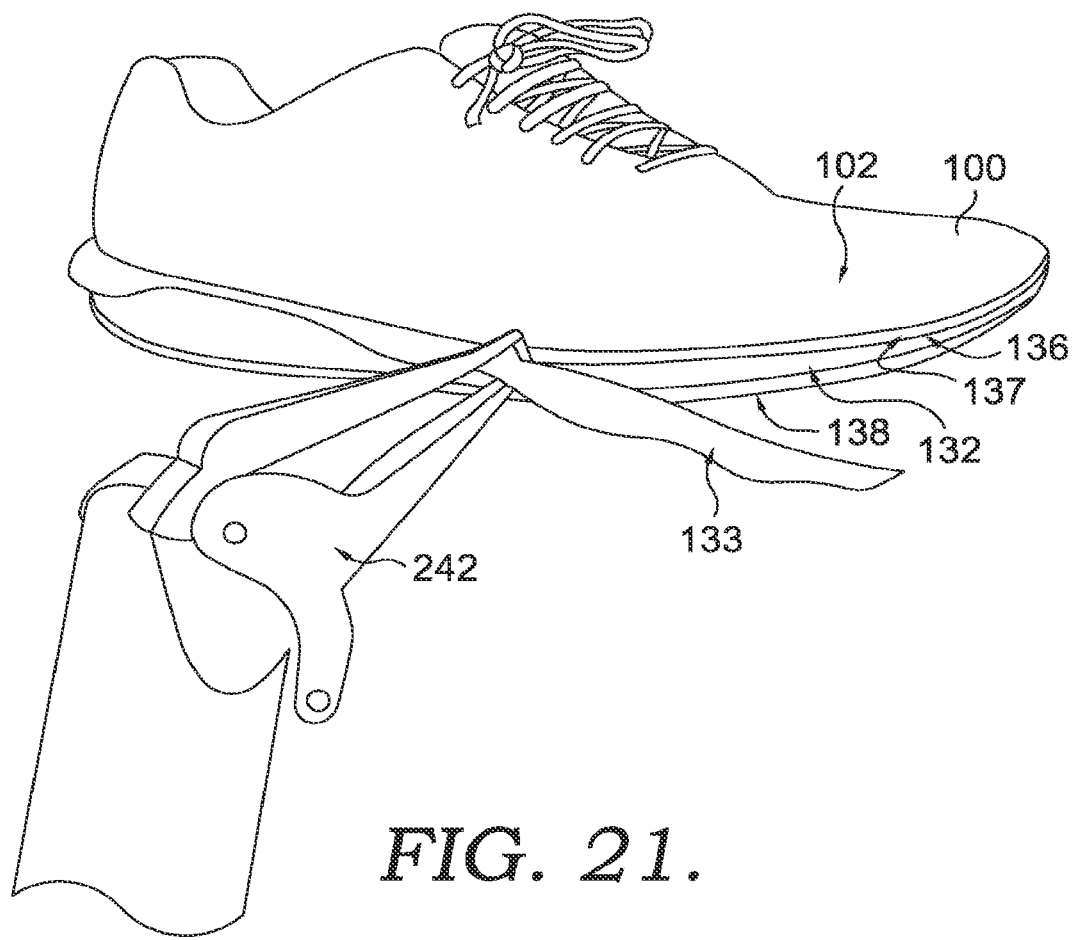
FIG. 21 depicts a trimming operation of the article of footwear from FIG. 20, in accordance with aspects hereof.

FIG. 21 depicts a trimming operation of the polymeric film composition 132, in accordance with aspects hereof. A cutting tool 242 is effective to cut the polymeric film composition 132 to spate the trimmed portion 133 from the sole. The cutting tool 242 may be any cutting tool, such as a knife, hot wire, laser, and the like. In an exemplary aspect, the cutting tool is an oscillating cutter that rests against the surface to be trimmed and cuts the material as the article is moved past the cutting portion. As the trimmed portion 133 is removed, the location of the cut forms the film edge, such as the lateral film edge 136 in the exemplary aspect. Below the lateral film edge 136, in the inferior direction, is the polymeric film composition 132 forming an exterior surface of the sole. Above the lateral film edge 136, in the superior direction, is the lateral exposed portion 137.

The trimming operation produces a crisp and definite transition between the polymeric film composition 132 and the polymeric foam composition 130. Therefore, a painting or printing operation is avoided to provide a precise transition between the materials.

Figure 22:
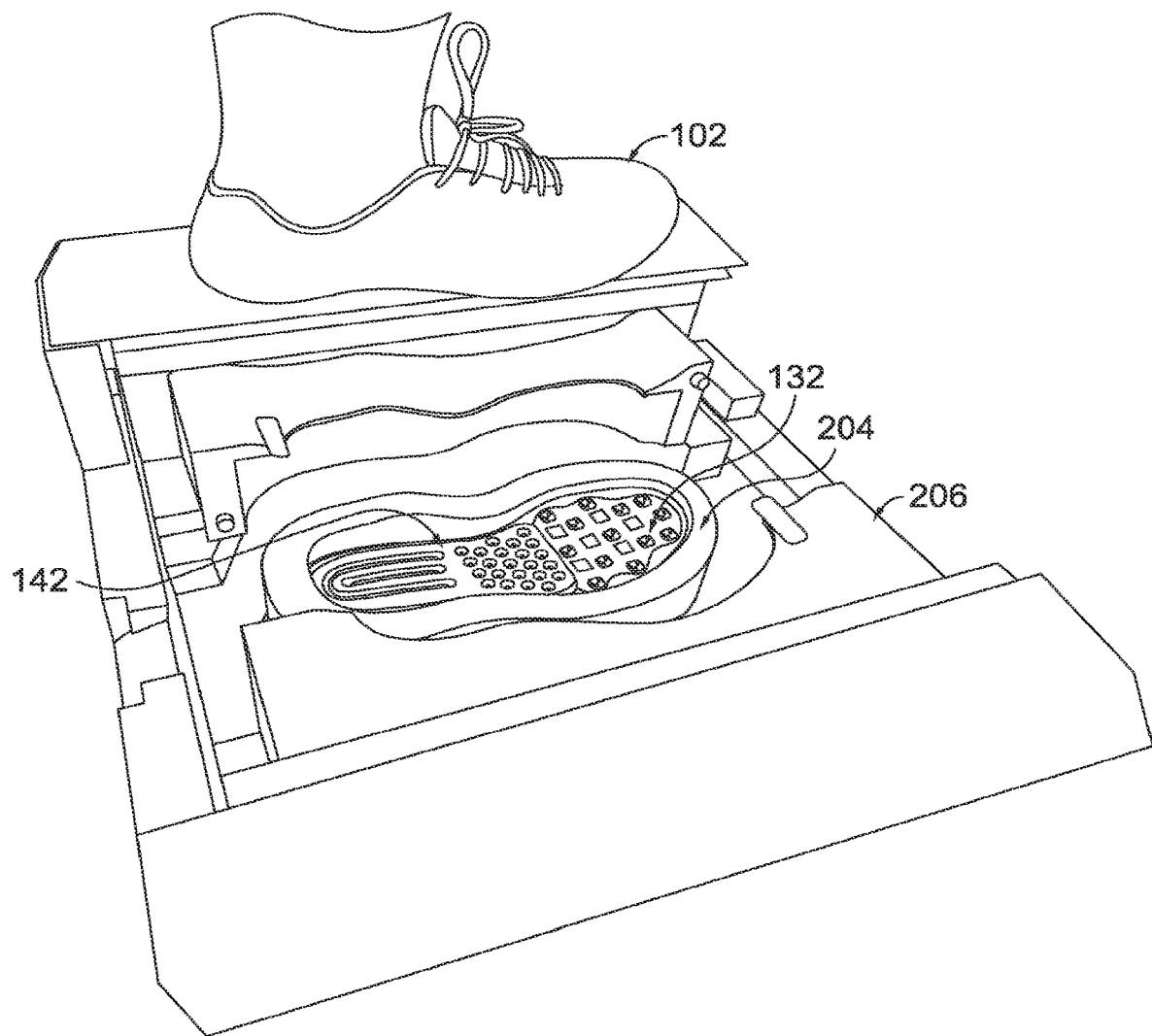
FIG. 22 depicts an alternative and optional process of inserting an insert into the mold cavity prior to direct bottoming an upper, in accordance with aspects hereof.

FIG. 22 depicts an alternative operation of inserting an insert 142 prior to direct bottoming the upper 102, in accordance with aspects hereof. In this example, the polymeric film composition 132 has been formed into a liner in the mold cavity and prior to injection the polymeric foam composition 130; the insert 142 is positioned in the mold cavity. In this example, an air bag to assist in impact attenuation and function of the sole is provided; however, as provided herein above, the insert may be a variety of materials and functions. Further, the insert may be positioned at a variety of location within the mold cavity, such as the arch, the ball region, and a combination of region. Further, as previously discussed, it is contemplated that any number of inserts of any combination of functions may be inserted into the mold cavity to be included during the direct bottoming process.

While the insert 142 is depicted as being placed into the mold cavity prior to positioning the upper 102 at the mold, it is contemplated that the insert 142 may alternatively be positioned at the mold with the upper 102. For example, the insert 142 may be temporarily or permanently secured to the upper 102 such that when the upper 102 is positioned at the mold, the insert 142 is also positioned at the mold. In aspects, some inserts when placed in the mold cavity prior to injecting the polymeric foam composition may interfere with an injection stream of the polymeric foam composition. Similarly, some inserts, such as an air bag or foam component may float on the injected foam composition and, as a result, be repositioned prior to a solidification of the polymeric foam composition. Therefore, aspects contemplate injecting the polymeric foam composition into the lined mold cavity prior to the insertion of the insert 142. The insertion may be incorporated with the positioning of the upper 102 or it may be a separate intervening step.

Figure 23:
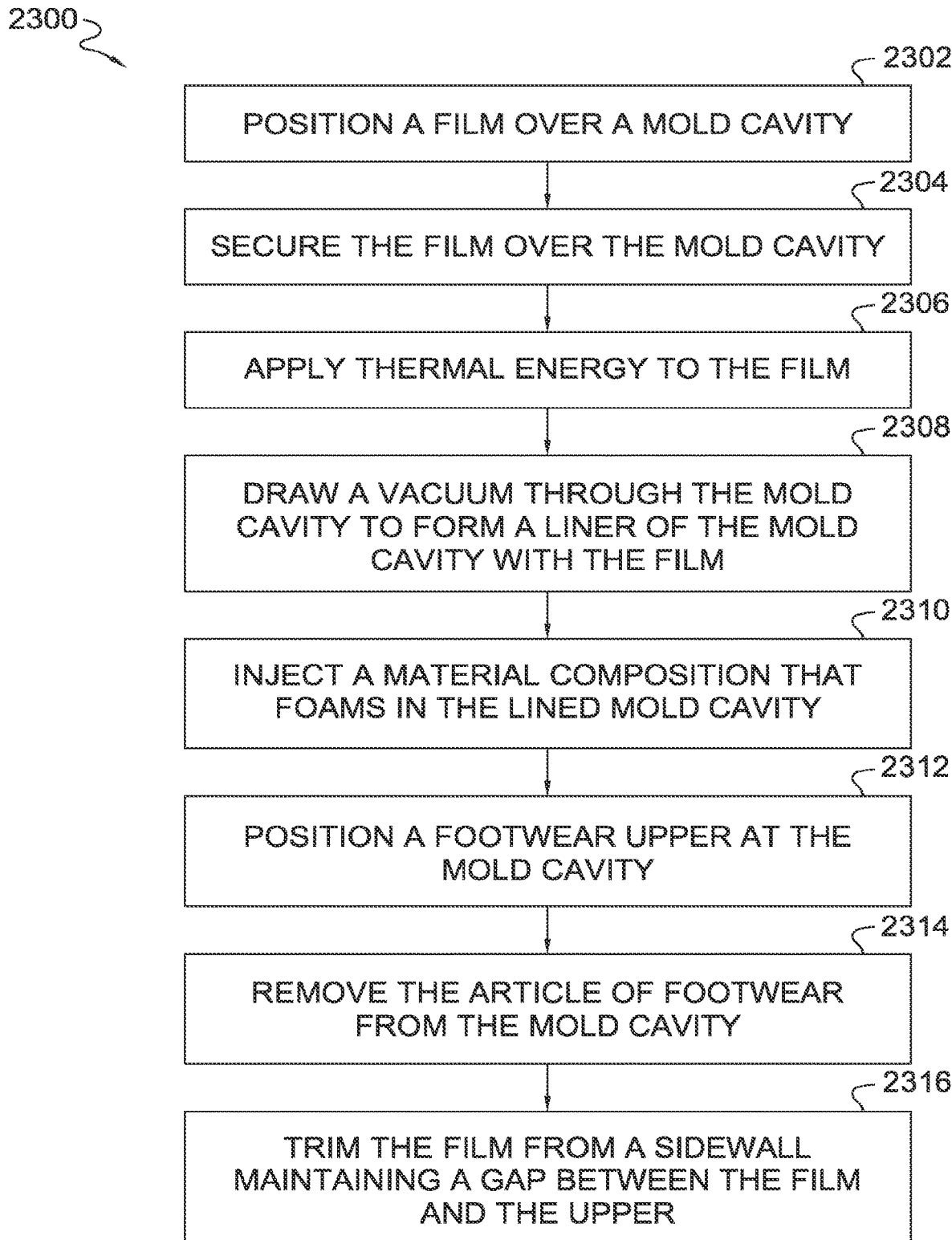
FIG. 23 depicts a flow chart illustrating an exemplary method of manufacturing an article of footwear, in accordance with aspects hereof.

FIG. 23 depicts a flow diagram representing a method 2300 of manufacturing an article of footwear, in accordance with aspects hereof. At a block 2302 a film, such as the polymeric film composition 132 of FIG. 1, is positioned over a mold cavity, such as the mold cavity 202 of FIG. 4. The positioning of the film may be accomplished by a human operator or an automated machine, such as a robotic arm. The positioning may be a mere placement or it may be an alignment that provides a predefined tension or sag to the film across the mold cavity. Referring to FIGS. 7, 9, and 11 provide examples of placing a film.

At a block 2304 the film is secured over the mold cavity. Exemplary techniques for securing the film were discussed at least in connection with FIGS. 7-14 herein above.

At a block 2306 thermal energy is applied to the film. The thermal energy may be in the form of infrared energy that is effective to heat the film to an elevated temperature that is below a glass transition temperature of the film. The elevated temperature allows for sufficient elongation of the film during a drawing process into the mold cavity.

At a block 2308 a vacuum is drawn through the mold cavity to form a liner of the mold cavity with the film. Because the film was secured in the block 2304, the vacuum causes a deformation of the film from a pressure differential on the opposing sides of the film. This pressure differential allows the film to be drawn into the mold cavity and conform to the mold surfaces.

At a block 2310 a material composition, such as the polymeric foam composition 130 of FIG. 1 is injected into the lined mold cavity. As the mold cavity is a sealed environment, the material expands and forms to the mold surfaces. In addition to forming to the mold surfaces, the material mechanically engages and intermingles with materials of an upper positioned at the mold cavity, as listed at a block 2312. It is understood that the upper may be positioned at the mold cavity prior to injecting the material. Therefore the order of the block 2310 and the block 2312 may be altered in various aspects. Regardless of the order of operation, the intermingling and interaction of the foamed material and the upper, the result is a bond is formed between the upper and the now-created sole. This bond is a direct bottoming operation that eliminates, in some aspect the use of adhesive to join the upper with the sole. Instead the creation of the sole itself results in a joining of the sole with the upper.

At a block 2314 the article of footwear formed in the preceding blocks is removed from the mold cavity. In some aspects the mold may split or otherwise open to allow for the removal of the article of footwear from the mold.

At a block 2316 the film is trimmed from the sole such that an exposed portion (a portion of the foamed material not covered in the film) is formed between the film and the upper on the sole sidewall. This exposed portion may be at least 1 mm. The exposed portion may have a range of 1 mm to 10 mm, in exemplary aspect. The exposed portion may be in a range of about 2 mm to 6 mm. Regardless, the exposed portion provides an area for the trimming operation to occur without interference from the upper. Further, the exposed region provides an aesthetic differentiator along the sidewall while still allowing the film to provide functional advantages discussed herein above along the sidewall(s).

As can be appreciated, the methods of forming the article of footwear provided herein are conducive to custom manufacturing. For example, it is contemplated that in a continuous manufacturing process different article of footwear are produced having different characteristics. For example, a first article of footwear may have a first visual characteristic and an immediately subsequently manufactured article of footwear has a different visual characteristic. This may be accomplished by inserting an alternative film while keeping other parameters constant. The alternative film may have a different color, texture, graphic, and the like. Further, it is contemplated that a different polymeric foam composition may be used on the first article of footwear as compared to the immediate subsequent article of footwear. For example a different additive, such as a colorant, may be incorporated with the polymeric foam composition at injection. This is different from traditional shoe manufacturing that maintains an inventor of both the upper and the sole to be joined. With the contemplated direct bottoming operation, the sole is manufactured at the time of joining. As a result, the manufactured sole may be customized as needed without keeping an inventory of different soles. Beyond visual characteristics that may be customized, the function of the sole may be customized through the inclusion of one or more inserts, as provided herein.

Further, as the film, such as the polymeric film composition, is effective to cure tooling marks formed by the mold and other tools, interchangeable mold components may be used. Traditionally, an interchangeable mold portion results in a tooling mark in the formed article as a result of a transition from the mold surface to the interchangeable component surface, which can generate a line at that transition. In the contemplated methods herein, the film cures the potential tooling marking by normalizing the surface transition between the mold surface and the interchangeable component surface. It is this normalization that allows for the interchangeable portions to be exchanged in a common mold to customize the formed sole. The interchangeable component may an embossments (e.g., positive space in the molded article) or debossments (e.g., negative space in the molded article) that generate logos, graphics, textures, and the like. As a result, a continuously operating manufacturing line may produce different article of footwear through the selection of films, foams, interchangeable components in the mold, and/or the like.

For convenience, a listing of features provided in FIGS. 1-22 is provided below.

Article of footwear—100
Upper—102
Upper medial side—106
Upper lateral side—108
Upper toe end—110
Upper heel end—112
Upper plantar region—114
Sole—104
Sole medial side—116
Sole lateral side—118
Sole toe end—120
Sole heel end—122
Upper-facing surface—123
Ground-facing surface—124
Medial sidewall—126
Lateral sidewall—128
Polymeric foam composition—130
Polymeric film composition—132
Trimmed portion—133
Medial film edge—134
Medial exposed portion—135
Lateral film edge—136
Lateral exposed portion—137
Outsole—138
Outsole aperture—140
Insert—142
First distance [at ground-facing surface]—144
Second distance [at the upper-facing surface]—146
Mold—200
Mold cavity—202
Inner ring—204
Outer ring—206
Bottom plate—208
First molding surface—210
Second molding surface—212

Medial sidewall of inner ring—214
Medial sidewall of outer ring—216
Lateral sidewall of inner ring—218
Lateral sidewall of outer ring—220
Bottom plate vacuum port—222
Inner ring vacuum port—224
Inner ring top surface—226
Heat source—228
Vacuum source—230
Injector—232
Material source—234
Robotic arm—236
Film source—238
Last—240
Cutting tool—242
Compression ring—246
Film aperture—248
Mold securement—250
Magnetic ring—251
Outside the mold cavity—252
Ring magnet—253
Removable molding element—254
Mold magnet—255
Vision system—256
Bottom plate actuator—258
Outer ring medial actuator—260
Outer ring lateral actuator—262

The following are example clauses representing aspects contemplated herein.

1. An article of footwear comprising: an upper comprising: a medial side, a lateral side, a toe end, a heel end, and a plantar region extending between the medial side, the lateral side, the toe end, and the heel end; and a sole having a medial side, a lateral side, a toe end, a heel end, an upper-facing surface extending between the medial side, the lateral side, the toe end, and the heel end, a ground-facing surface opposite the upper-facing surface, a medial sidewall extending between the ground-facing surface and the upper facing surface along the medial side, and a lateral sidewall extending between the ground-facing surface and the upper-facing surface along the lateral side, the sole comprising: a polymeric foam composition forming at least a portion of the upper-facing surface and mechanically engaged with the upper plantar region; and a polymeric film composition forming at least a portion of the medial side wall from the ground-facing surface toward the upper at a medial film edge and also forming at least a portion of the lateral side wall from the ground-facing surface toward the upper at a lateral film edge, wherein there is at least 1 mm between the upper-facing surface at the medial sidewall and the medial film edge and there is at least 1 mm between the upper-facing surface at the lateral sidewall and the lateral film edge.

2. The article of footwear of clause 1 further comprising an outsole, the outsole coupled with the ground-facing surface.

3. The article of footwear of clause 2, wherein the outsole is coupled with the film composition on the ground-facing surface of the sole.

4. The article of footwear of clause 3, wherein an adhesive couples the outsole and the film composition.

5. The article of footwear of clause 2, wherein the outsole is comprised of an aperture extending through the outsole to the film composition on the ground-facing surface.

6. The article of footwear of clause 2, wherein the sole further comprises an insert, the insert at least partially encased by the polymeric foam composition and the polymeric film composition.

7. The article of footwear of clause 1, wherein the medial sidewall angles toward the lateral sidewall as the medial sidewall extends from the ground-facing surface toward the upper-facing surface between the toe end and the heel end.

8. The article of footwear of clause 1, wherein a first distance between the medial sidewall and the lateral sidewall at the ground-facing surface is greater than a second distance between the medial sidewall and the lateral sidewall at the upper-facing surface.

9. The article of footwear of clause 1, wherein the polymeric foam composition comprises a polyurethane composition and the polymeric film composition comprises a thermoplastic polyurethane composition.

10. The article of footwear of clause 1, wherein the polymeric film composition extends between the medial sidewall and the lateral sidewall on the ground-facing surface.

11. The article of footwear of clause 1, wherein the polymeric foam composition forms the medial side wall between the medial film edge and the upper-facing surface and the polymeric foam composition forms the lateral side wall between the lateral film edge and the upper-facing surface.

12. The article of footwear of clause 1, wherein the polymeric film composition has a different visual characteristic than the polymeric foam composition on at least the medial sidewall.

13. A method of making an article of footwear, the method comprising:
positioning a polymeric film composition over a mold cavity of a mold having a first molding surface forming a ground-facing surface of a footwear sole, and a second molding surface forming a sidewall of the footwear sole; securing the polymeric film composition over the mold cavity to enclose the mold cavity; applying thermal energy to the polymeric film composition; drawing a vacuum through the mold cavity enclosed by polymeric film composition until at least a portion of the polymeric film composition contacts the first molding surface and the second molding surface as the polymeric film composition forms a liner for at least a portion of the mold cavity; injecting a material composition that will foam as a polymeric foam composition into the mold cavity with the polymeric film composition as the liner of at least a portion of the mold cavity; positioning a footwear upper at the mold cavity, wherein the footwear upper is positioned such that the polymeric foam composition mechanically engages with the footwear upper to form the article of footwear; removing the article of footwear from the mold cavity; and trimming the polymeric film composition from at least the sidewall, wherein the polymeric film composition extends up to a film edge on the sidewall that is at least 1 mm from the upper.

14. The method of manufacturing an article of footwear of clause 13, wherein the polymeric foam composition comprises a polyurethane composition and the polymeric film composition comprises a thermoplastic polyurethane composition 15. The method of manufacturing an article of footwear of clause 13, wherein the positioning of the polymeric film composition comprises a robotic arm securing the polymeric film composition, moving the polymeric film position, and depositing the polymeric film composition over the mold cavity.

16. The method of manufacturing an article of footwear of clause 13, wherein securing the polymeric film composition comprises: positioning a ring over the polymeric film composition; and compressing the polymeric film composition between mold and the ring.

17. The method of manufacturing an article of footwear of clause 13, wherein securing the polymeric film composition comprises securing an aperture extending through the polymeric film composition with a portion of the mold.

18. The method of manufacturing an article of footwear of clause 17, wherein the portion of the mold to which the polymeric film aperture is secured is selected from a pin or a hook.

19. The method of manufacturing an article of footwear of clause 13, wherein securing the polymeric film composition comprises applying a vacuum pressure to the polymeric film composition outside of the mold cavity to secure the polymeric film composition to the mold.

20. The method of manufacturing an article of footwear of clause 13 further comprising, prior to positioning the polymeric film composition, inserting a removable molding element into the sidewall of the mold cavity.

21. The method of manufacturing an article of footwear of clause 13, wherein the mold cavity forms angled sidewalls of the footwear sole as the sidewalls extend from the ground-facing surface.

22. A method of manufacturing a plurality of different articles of footwear with a common mold, the method comprising: positioning a first polymeric film composition over a mold cavity of a mold having a first molding surface forming a ground-facing surface of a footwear sole, and a second molding surface forming a sidewall of the footwear sole; securing the first polymeric film composition over the mold cavity to enclose the mold cavity; drawing a vacuum through the mold cavity enclosed by first polymeric film composition until at least a portion of the first polymeric film composition contacts the first molding surface and the second molding surface as the first polymeric film composition forms a first liner for at least a portion of the mold cavity; positioning a first footwear upper at the mold cavity, wherein the first footwear upper is positioned such that an injected polymeric foam composition mechanically engages with the first footwear upper to form a first article of footwear comprised of the first polymeric film composition, the polymeric foam composition, and the first upper; removing the first article of footwear from the mold cavity; positioning a second polymeric film composition over the mold cavity, wherein the second polymeric film composition has a different visual characteristic than the first polymeric film composition; securing the second polymeric film composition over the mold cavity to enclose the mold cavity; drawing a vacuum through the mold cavity enclosed by second polymeric film composition until at least a portion of the second polymeric film composition contacts the first molding surface and the second molding surface as the second polymeric film composition forms a second liner for at least a portion of the mold cavity; positioning a second footwear upper at the mold cavity, wherein the second footwear upper is positioned such that an injected polymeric foam composition mechanically engages with the second footwear upper to form a second article of footwear comprised of the second polymeric film edger, the polymeric foam composition, and the second footwear upper; and removing the second article of footwear from the mold cavity.

23. An article of footwear mold comprising: an inner ring mold having an inner medial sidewall molding surface and an inner lateral sidewall molding surface; an outer ring mold having an outer medial sidewall molding surface and an outer lateral sidewall molding surface, wherein the inner medial sidewall molding surface and the outer medial sidewall molding surface in combination form a medial sidewall molding surface of the article of footwear mold and the inner lateral sidewall molding surface and the outer lateral sidewall molding surface in combination form a lateral sidewall molding surface of the article of footwear mold: and a bottom plate positioned between the inner medial sidewall molding surface and the inner lateral sidewall molding surface.

24. The article of footwear mold of clause 23 further comprising a polymeric film composition securement.

25. The article of footwear mold of clause 24, wherein the polymeric film composition securement comprises a plurality of pins extending from the inner ring mold, wherein at least a pin is located on a medial side of the inner ring mold, at least a pin is located on a lateral side of the inner ring mold, at least a pin is located on a toe end of the inner ring mold, and at least a pin is located on a heel end of the inner ring mold.

26. The article of footwear mold of clause 24, wherein the polymeric film composition securement comprises a plurality of protrusions extending from the inner ring mold.

27. The article of footwear mold of clause 24, wherein the polymeric film composition securement comprises a vacuum port at a top surface of the inner ring mold.

28. The article of footwear mold of clause 27 wherein at least a vacuum port is located on the top surface at a medial side of the inner ring mold, at least a vacuum port is located on the top surface at a lateral side of the inner ring mold, at least a vacuum port is located on the top surface at a toe end of the inner ring mold, and at least a vacuum port is located on the top surface at a heel end of the inner ring mold.

29. The article of footwear mold of clause 23, wherein the bottom plate is comprised of a vacuum port extending through the bottom plate to a bottom plate top surface.

30. The article of footwear mold of clause 29 further comprising a vacuum port at a top surface of the inner ring mold.

31. The article of footwear mold of clause 30, wherein the vacuum port at the top surface of the inner ring mold is operatively coupled with a vacuum source and the vacuum port extending through the bottom plate is operatively coupled with a vacuum source.

32. The article of footwear mold of clause 31, wherein the vacuum port at the top surface of the inner ring mold is independently operable from the vacuum port extending through the bottom plate.

33. The article of footwear mold of clause 24, wherein the polymeric film composition securement comprises a magnet at a top surface of the inner ring mold.

34. The article of footwear mold of clause 33 wherein the magnet is an electromagnet.

35. The article of footwear mold of clause 33, wherein the magnet is a permanent magnet.

36. The article of footwear mold of clause 24, wherein the polymeric film composition securement comprises a compression ring.

37. The article of footwear mold of clause 36, wherein the inner ring mold comprises a lip at a top surface and the compression ring is configured to fit around the lip.

38. The article of footwear mold of clause 23 further comprising a magnetic ring.

39. The article of footwear mold of clause 38, wherein at least one of the magnetic ring and the inner ring mold comprise a magnet.

40. The article of footwear mold of clause 38, wherein the magnetic ring comprises a first magnet and the inner ring mold comprise a second magnet, wherein the first magnet and the second magnet magnetically attract the magnetic ring to the inner ring mold.

41. The article of footwear mold of clause 23, wherein the inner medial sidewall molding surface and the inner lateral sidewall molding surface converge as they extend away from the bottom plate toward an inner ring mold top surface.

42. The article of footwear mold of clause 23, further comprising a first actuator coupled to a first half of the outer ring and a second actuator coupled to a second half of the outer ring.

43. An article of footwear mold comprising: a mold having a medial sidewall molding surface and a lateral sidewall molding surface; a polymeric film composition securement: and a bottom plate positioned between the medial sidewall molding surface and the lateral sidewall molding surface.

44. The article of footwear mold of clause 43, wherein the polymeric film composition securement comprises a plurality of pins extending from the mold, wherein at least a pin is located on a medial side of the mold, at least a pin is located on a lateral side of the mold, at least a pin is located on a toe end of the mold, and at least a pin is located on a heel end of the mold.

45. The article of footwear mold of clause 43, wherein the polymeric film composition securement comprises a plurality of protrusions extending from mold.

46. The article of footwear mold of clause 43, wherein the polymeric film composition securement comprises a vacuum port at a top surface of the mold.

47. The article of footwear mold of clause 46 wherein at least a vacuum port is located on the top surface at a medial side of the mold, at least a vacuum port is located on the top surface at a lateral side of the mold, at least a vacuum port is located on the top surface at a toe end of the mold, and at least a vacuum port is located on the top surface at a heel end of the mold.

48. The article of footwear mold of clause 43, wherein the bottom plate is comprised of a vacuum port extending through the bottom plate to a bottom plate top surface.

49. The article of footwear mold of clause 48 further comprising a vacuum port at a top surface of the mold.

50. The article of footwear mold of clause 49, wherein the vacuum port at the top surface of the mold is operatively coupled with a vacuum source and the vacuum port extending through the bottom plate is operatively coupled with a vacuum source.

51. The article of footwear mold of clause 50, wherein the vacuum port at the top surface of the mold is independently operable from the vacuum port extending through the bottom plate.

52. The article of footwear mold of clause 43, wherein the polymeric film composition securement comprises a magnet at a top surface of the mold.

53. The article of footwear mold of clause 52, wherein the magnet is an electromagnet.

54. The article of footwear mold of clause 52, wherein the magnet is a permanent magnet.

55. The article of footwear mold of clause 43, wherein the polymeric film composition securement comprises a compression ring.

56. The article of footwear mold of clause 55, wherein the mold comprises a lip at a top surface and the compression ring is configured to fit around the lip.

57. The article of footwear mold of clause 43 further comprising a magnetic ring.

58. The article of footwear mold of clause 57, wherein at least one of the magnetic ring and the mold comprise a magnet.

59. The article of footwear mold of clause 57, wherein the magnetic ring comprises a first magnet and the mold comprise a second magnet, wherein the first magnet and the second magnet magnetically attract the magnetic ring to the mold.

60. The article of footwear mold of clause 43, wherein the medial sidewall molding surface and the lateral sidewall molding surface converge as they extend away from the bottom plate toward a mold top surface.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

The invention claimed is:
1. An article of footwear comprising:
an upper comprising:
(1) a medial side, a lateral side, a toe end, a heel end, and a plantar region extending between the medial side, the lateral side, the toe end, and the heel end; and
a sole having a medial side, a lateral side, a toe end, a heel end, an upper-facing surface extending between the medial side, the lateral side, the toe end, and the heel end, a ground-facing surface opposite the upper-facing surface, a medial sidewall extending between the ground-facing surface and the upper-facing surface along the medial side, and a lateral sidewall extending between the ground-facing surface and the upper-facing surface along the lateral side, the sole comprising:
(1) a polymeric foam composition forming at least a portion of the upper-facing surface and mechanically engaged with the upper plantar region; and
(2) a polymeric film composition forming at least a portion of the medial sidewall from the ground-facing surface toward the upper at a medial film edge and also forming at least a portion of the lateral sidewall from the ground-facing surface toward the upper at a lateral film edge, wherein there is at least 1 mm between the upper-facing surface at the medial sidewall and the medial film edge and there is at least 1 mm between the upper-facing surface at the lateral sidewall and the lateral film edge.

2. The article of footwear of claim 1, further comprising an outsole, the outsole coupled with the ground-facing surface.

3. The article of footwear of claim 2, wherein the outsole is coupled with the polymeric film composition on the ground-facing surface of the sole.

4. The article of footwear of claim 3, wherein an adhesive couples the outsole and the polymeric film composition.

5. The article of footwear of claim 2, wherein the outsole is comprised of an aperture extending through the outsole to the polymeric film composition on the ground-facing surface.

6. The article of footwear of claim 2, wherein the sole further comprises an insert, the insert at least partially encased by the polymeric foam composition and the polymeric film composition.

7. The article of footwear of claim 1, wherein the medial sidewall angles toward the lateral sidewall as the medial sidewall extends from the ground-facing surface toward the upper-facing surface between the toe end and the heel end.

8. The article of footwear of claim 1, wherein a first distance between the medial sidewall and the lateral sidewall at the ground-facing surface is greater than a second distance between the medial sidewall and the lateral sidewall at the upper-facing surface.

9. The article of footwear of claim 1, wherein the polymeric foam composition comprises a polyurethane composition and the polymeric film composition comprises a thermoplastic polyurethane composition.

10. The article of footwear of claim 1, wherein the polymeric film composition extends between the medial sidewall and the lateral sidewall on the ground-facing surface.

11. The article of footwear of claim 1, wherein the polymeric foam composition forms the medial sidewall between the medial film edge and the upper-facing surface and the polymeric foam composition forms the lateral sidewall between the lateral film edge and the upper-facing surface.

12. The article of footwear of claim 1, wherein the polymeric film composition has a different visual characteristic than the polymeric foam composition on at least the medial sidewall.

* * * * *